United States Patent
Sasaya

(10) Patent No.: US 9,195,033 B2
(45) Date of Patent: Nov. 24, 2015

(54) IMAGING OPTICAL SYSTEM AND IMAGING EQUIPMENT

(71) Applicant: Toshihiro Sasaya, Tokyo (JP)

(72) Inventor: Toshihiro Sasaya, Tokyo (JP)

( * ) Notice: Subject to any disclaimer, the term of this patent is extended or adjusted under 35 U.S.C. 154(b) by 69 days.

(21) Appl. No.: 14/227,721

(22) Filed: Mar. 27, 2014

(65) Prior Publication Data

US 2014/0293100 A1 Oct. 2, 2014

(30) Foreign Application Priority Data

Mar. 28, 2013 (JP) ................................. 2013-070294

(51) Int. Cl.
| | |
|---|---|
| *G02B 13/04* | (2006.01) |
| *G02B 13/00* | (2006.01) |
| *G02B 13/18* | (2006.01) |
| *H04N 5/351* | (2011.01) |

(52) U.S. Cl.
CPC ............ *G02B 13/04* (2013.01); *G02B 13/0045* (2013.01); *G02B 13/0085* (2013.01); *G02B 13/18* (2013.01); *H04N 5/351* (2013.01)

(58) Field of Classification Search
CPC ............... G02B 13/04; G02B 13/0045; G02B 13/0085; G02B 13/18; G02B 9/64; G02B 3/04; H04N 5/351

See application file for complete search history.

(56) References Cited

U.S. PATENT DOCUMENTS

| | | | |
|---|---|---|---|
| 8,134,787 B2 * | 3/2012 | Saitoh ........................... | 359/753 |
| 8,654,457 B2 * | 2/2014 | Jin et al. ........................ | 359/763 |
| 2007/0206295 A1 * | 9/2007 | Yamashita et al. ............ | 359/717 |

FOREIGN PATENT DOCUMENTS

| | | |
|---|---|---|
| JP | 09-015492 | 1/1997 |
| JP | 3929479 | 3/2007 |
| JP | 3946245 | 7/2007 |
| JP | 2009-063877 | 3/2009 |
| JP | 2010-107820 | 5/2010 |
| JP | 2012-053384 | 3/2012 |
| JP | 2012-113149 | 6/2012 |

* cited by examiner

*Primary Examiner* — David N Spector
(74) *Attorney, Agent, or Firm* — Knobbe Martens Olson & Bear LLP

(57) ABSTRACT

There are provided an imaging optical system and imaging equipment, which are compatible with a solid-state imaging device having a size of ½ inches or less and which include an optical system having a small size and lightness in weight and also having an excellent mass productivity and a low cost while keeping optical performance at a wide field angle, for example, at a total angle of view of 80 degrees or more. When predetermined conditions are satisfied for a plurality of lenses constituting the imaging optical system, the absolute value of power of each lens group is suppressed to be small, and thus the generation of aberration is suppressed and a preferable aberration is obtained.

7 Claims, 13 Drawing Sheets

IMAGING OPTICAL SYSTEM AND IMAGING EQUIPMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

CROSS-REFERENCE TO RELATED APPLICATIONS

This application claims the benefit of priority to Japanese Patent Application No. 2013-070294, entitled "Imaging Optical System and Imaging Equipment" filed on Mar. 28, 2013. The disclosure of the above-described application is hereby expressly incorporated by reference in its entirety.

BACKGROUND

1. Field of the Invention

The present invention relates to an imaging optical system for imaging equipment and imaging equipment each of which uses a compact solid-state imaging device such as a CCD image sensor and a CMOS image sensor having a size of ½ inches or less.

2. Description of the Related Art

In imaging equipment using the solid-state imaging device, the imaging optical system in the imaging equipment for action camera or car-mounted camera is required to have a wider field angle and improved thermal characteristics other than a small size and lightness in weight and a high resolution. Furthermore, the imaging optical system of the car-mounted camera is also required to have a capability of being produced at a low cost and in large quantities and to allow for solder reflow mounting onto the imaging equipment. As a method for the mass production, it is preferable to be capable of dealing with a wafer level lens manufacturing method.

As an imaging lens which realizes a small size and lightness in weight and enables a mass production as described above, there is an imaging lens having a doublet-type lens group configuration or a triplet-type lens group configuration, in which the solder reflow can be used and thermal characteristics are improved by forming a resin lens on a flat glass plate or a glass lens (hybrid type) (refer to Japanese Patent No. 3929479 and Japanese Patent No. 3946245).

In addition, as a similar imaging lens, there is an imaging lens which realizes a wider field angle by means of arranging a thick glass-made concave lens having a strong negative power on the front side of a hybrid lens (refer to Japanese Patent Laid Open No. 2012-113149).

Furthermore, as a similar imaging lens, there is an imaging lens which has a fast wide lens while suppressing cost for forming a resin lens configuration of 4 groups 4 lenses (refer to Japanese Patent Laid Open No. 1997-015492).

Moreover, as a similar imaging lens, there is an imaging lens which can deal with a wider field angle, a higher resolution, and a lower cost by forming the first lens with a spherical glass lens in a configuration of 4 groups 5 lenses and by bonding two lenses to each other among the other four aspherical resin lenses (refer to Japanese Patent Laid Open No. 2009-063877).

In addition, as a similar imaging lens, there is an imaging lens in which a low cost and compact size wide lens is realized by forming the first lens with a spherical glass lens in a configuration of 4 groups 4 lenses and by constituting the other three lenses with the use of three aspherical resin lenses or two aspherical resin lenses and a spherical glass lens (refer to Japanese Patent Laid Open No. 2010-107820).

Furthermore, as a similar lens, there is an imaging lens which realizes an optical system having a compact-size and a low-cost production capability by a configuration using a small thickness lens (refer to Japanese Patent Laid Open No. 2012-053384).

However, since the imaging lens as disclosed in Japanese Patent No. 3929479 and Japanese Patent No. 3946245 is a hybrid type lens in which a plane parallel glass plate or a glass lens close to the plane parallel plate is used as a base in a lens system, the shape of the whole lens system is restricted by a base glass shape. Accordingly, for example, it is difficult to form the lens system as a wide lens having a short focal length. In the examples shown in Japanese Patent No. 3929479 and Japanese Patent No. 3946245, the field angle (semi-field angle) w is approximately 32 degrees and the field angle is not sufficient to be applied to a wide lens of a car-mounted camera or the like.

While a wider field angle is realized by arranging a glass lens having a strong power on the front side of a hybrid type lens in Japanese Patent Laid Open No. 2012-113149, the glass lens for realizing a wider field angle has a large thickness and a small radius of curvature and is difficult to manufacture, and the shape of the hybrid type lens has a large amount of sag and is also difficult to be manufactured.

In Japanese Patent Laid Open No. 1997-015492, Japanese Patent Laid Open No. 2009-063877, Japanese Patent Laid Open No. 2010-107820 and Japanese Patent Laid Open No. 2012-053384, shape restriction is relaxed by the use of an ordinary resin lens or glass lens without the use of a hybrid type lens.

However, in Japanese Patent Laid Open No. 1997-015492, a surface having a small radius of curvature and a strong curvature is used on the image plane side of each lens, and thus tolerance becomes severe, aberration is also easily caused, and compactness is lost. In addition, the correction of the aberration such as color aberration is not sufficient because of a configuration using a single glass material.

In addition, Japanese Patent Laid Open No. 2009-063877 makes great use of a surface having a small radius of curvature for a concave lens or a cemented lens surface, and thus tolerance becomes severe and also aberration is easily caused. Thickness differences among the respective constituent lenses are large and also there exists a lens with a lens thickness almost close to a lens outer diameter thereof, and thus it is not possible to deal with the wafer level lens manufacturing.

Furthermore, in Japanese Patent Laid Open No. 2010-107820, a glass material having a high optical index is used for the first lens and the like, and thus manufacturing cost is increased. In addition, a relatively high power is provided to each lens, and thus aberration changes significantly among the lenses, and tolerance is severe and also aberration is easily caused.

Moreover, in Japanese Patent Laid Open No. 2012-053384, while compactness and low-cost production are considered to be possible, the field angle of a target optical system is small, and when the field angle is tried to be increased, the power of each lens becomes stronger with respect to the power of the whole lenses and also the radius of curvature of a constituent surface becomes small, resulting in a large aberration.

SUMMARY

According to some implementations, an imaging optical system and imaging equipment are provided, which are compatible with a solid-state imaging device having a size of ½ inches or less and which include an optical system having a small size and lightness in weight and also having an excellent mass productivity and a low cost, while keeping excellent optical performance at a wide field angle, for example, at a total angle of view of 80 degrees or more.

In order to solve the above-mentioned problems, an imaging optical system according to some implementations for a solid-state imaging device having an image size of ½ inches or less includes a plurality of lens groups, wherein a half or more than half of a total number of single lenses constituting the plurality of lens groups have aspherical surfaces, F number is smaller than 4, and the following Conditional Formulas (1), (2), (3), (4), and (5) are satisfied, when a focal length of the whole imaging optical system is set to $f_A$, each lens group number in the plurality of lens groups is set to i, a focal length in each of the lens groups is set to $f_i$, each lens number of single lenses constituting the lens groups is set to j, an optical index of the lens having the lens number j is set to $n_j$, a radius of curvature on an object side of the single lens having the lens number j is set to $R_{j1}$, the radius of curvature on an image side of the single lens is set to $R_{j2}$, furthermore, the radius of curvature on the object side of a biconvex lens or a biconcave lens among the single lenses is set to $R_{j1(R)}$, the radius of curvature on the image side of the biconvex lens or the biconcave lens is set to $R_{j2(R)}$, an aperture stop position is located between the lens having a lens number m and the lens having a lens number (m+1), and a field angle is set to w.

$$f_A/|f_i|<0.425 \quad (1)$$

$$|R_{jk}|/f_A>1.5 \ (j\leq m, k=1,2) \quad (2)$$

$$|R_{jk(R)}|/f_A>2.0 \ (j>m, k=1,2) \quad (3)$$

$$n_j<1.80 \quad (4)$$

$$w>40° \quad (5)$$

Meanwhile, the lens group number i is counted as one group for each single lens or cemented lens, from the object side. Therefore, when all the lenses constituting the optical system are, for example, single lenses, the lens group number i coincides with the lens number j, but when a cemented lens exists, the total number of lens numbers becomes larger than the total number of lens group numbers by one for every bonding (conversely, the total number of lens group numbers becomes smaller than the total number of lens numbers by one). In addition, it is assumed here that a lens having a positive focal length is a convex lens and a lens having a negative focal length is a concave lens. Furthermore, in the case of an aspherical lens, it is assumed that whether the aspherical lens is a biconvex lens, a biconcave lens, or a meniscus lens it is defined on the basis of a paraxial radius of curvature. Here, the meniscus lens indicates a lens having the same sign of the radius of curvature (paraxial radius of curvature in the case of an aspherical surface) on the front and back sides of the lens.

In addition, as to the radius of curvature of each surface, the value of the radius of curvature close to a vertex on an optical axis is used as the radius of curvature when the surface is an aspherical surface. For example, when the lens having the lens number j includes an aspherical surface and the second order aspherical coefficient thereof is set to $\alpha_{jk2}$, the radius of curvature close to the vertex on the optical axis becomes $R_{jk}$ when the value $\alpha_{jk2}$ is zero, and the radius of curvature close to the vertex on the optical axis can be set to $R'_{jk}$ which is defined by the next formula, when the second spherical coefficient $\alpha_{jk2}$ is not zero.

$$1/R'_{jk}=1/R_{jk}+2\alpha_{jk2} \quad ()$$

Among the above conditional formulas, Conditional Formula (1) defines a ratio of the focal length of the whole optical system $f_A$ to the absolute value $|f_i|$ of the focal length $f_i$ of each lens group. Here, as to the focal length f, generally 1/f which is the inverse number of f is the power of a lens. When Conditional Formula (1) is viewed from this point, the left-hand side of Conditional Formula (1) defines an absolute value of the power in each lens group when the power of the whole optical system is set to be 1. The fact that this value on the left-hand side is smaller than 0.425 which is shown on the right-hand side of Conditional Formula (1) for all the lens groups means that the whole optical system is constituted of the lens groups each having relatively weak power. That is, when Conditional Formula (1) is satisfied, the absolute value of the power in each lens group is suppressed to be small, generation of aberration is suppressed, and also the whole optical system is constituted of the lens which is easily manufactured.

Furthermore, Conditional Formula (2) defines the lower limit for the absolute value of the radius of curvature in each lens located on the front side of the aperture stop position by a ratio to the focal length $f_A$ of the whole optical system. By satisfying Conditional Formula (2), it is possible to suppress the generation of the aberration in the lenses on the front side of the aperture stop in which the radius of curvature tends to become smaller than the focal length of the whole optical system when a wide lens is manufactured.

Moreover, Conditional Formula (3) defines the lower limit for the absolute value of each radius of curvature by a ratio to the focal length $f_A$ of the whole optical system as to the biconvex lens or the biconcave lens among the lenses on the back side of the aperture stop position. By satisfying Conditional Formula (3), it is possible to suppress the generation of the aberration in the biconvex lens or the biconcave lens among the lenses on the back side of the aperture stop position in which the radius of curvature tends to become shorter than the focal length of the whole optical system when the wide lens is manufactured.

In the above Conditional Formulas (2) and (3), there is provided definition individually for radii of curvature of the respective lens on the front side and the lens on the back side of the aperture stop position. Here, the definition is provided to all the lenses as to the lenses on the front side of the aperture stop position and the definition is provided to the biconvex lens and the biconcave lens as to the lenses on the back side of the aperture stop position. Meanwhile, a single lens having the lens number j may be bonded to the neighboring lens to configure a lens group. Therefore, it becomes possible to manufacture each lens in an excellent mass productivity and at a low cost, while keeping optical performance of a wide field angle and also a suppressed aberration.

Furthermore, Conditional Formula (4) defines the upper limit of the optical index of each lens. That is, it means that each lens is manufactured using a comparably inexpensive material without using an optical material having a high optical index.

Moreover, Conditional Formula (5) defines the lower limit of the field angle w of the optical system. That is, it means that the imaging optical system can be applied as a wide lens.

In the above described imaging optical system, by satisfying the above Formulas (1) to (5), it is possible to manufacture an optical system which has a small size and lightness in weight in an excellent mass productivity and at a low cost while keeping optical performance of a wide field angle, for example, a total angle of view of 80 degrees or more, and, at the same time, it is possible to realize an inexpensive optical system by not using an optical material having a high optical index. Meanwhile, in addition to the above, a half or more than half of the single lenses constituting the lens groups have aspherical surfaces.

Furthermore, in order to realize an inexpensive optical system having a wider field angle and a better mass productivity while keeping a preferable aberration, it is preferable to satisfy the following Conditional Formulas (1-1), (2-1), (3-1), (4-1), and (5-1) in which ranges are further limited from those in the above Conditional Formulas (1) to (5).

$$f_A/|f_i|<0.40 \quad (1\text{-}1)$$

$$|R_{jk}|/f_A>1.55 \ (j \leq m, k=1,2) \quad (2\text{-}1)$$

$$|R_{jk(R)}|/f_A>2.3 \ (j>m, k=1,2) \quad (3\text{-}1)$$

$$n_j<1.70 \quad (4\text{-}1)$$

$$w>50° \quad (5\text{-}1)$$

Meanwhile, in the case of the optical system having the aperture stop on the first surface, that is, on the object side of the lens positioned closest to the object, Conditional Formulas (2) and (2-1) may not be included in the conditions. Moreover, in the case of the optical system without having a biconvex lens or biconcave lens on the back side of the aperture stop, Conditional Formulas (3) and (3-1) may not be included in the conditions.

Here, the process according to some implementations will be explained briefly. As a premise, it is necessary to make the image plane flat with respect to rays having a wide incident angle range in order to obtain a lens having a wide field angle. As an index expressing a basic property of an image plane, there is used a petzval sum which is indicated by the next Formula (17) when the optical index of each lens is set to $n_q$ and the focal length is set to $f_q$. Meanwhile, the inverse number of this value corresponds to the radius of curvature of an image plane in the paraxial region close to the optical axis.

$$p=\Sigma(1/n_q f_q) \quad (17)$$

In order to keep the image plane flat, it is necessary to reduce the value of the petzval sum of the above Formula (17). Keeping the petzval sum small is carried out by appropriately adjusting the focal length $f_q$ of each constituent lens between a positive value and a negative value to thereby distribute lens power $1/f_q$ suitably and appropriately allocating the optical index $n_q$ of an optical material to be used. However, when the distribution of the lens power $1/f_q$ is moved largely, a surface having a strong power comes to exist, and various aberrations are easily generated and the manufacturing of the surface becomes difficult. In particular, when a surface having a small radius of curvature and a strong power exists, it becomes difficult to deal with the wafer-level manufacturing method.

Furthermore, while the petzval sum can be reduced by the use of an optical material having an optical index higher than that of a typical material, as an optical index $n_q$ of the optical system, it is difficult to manufacture the lens at a low cost because the cost of the material is increased.

From this point of view, as to the imaging optical system, in order to produce the lens stably at a low cost while keeping a preferable image plane and dealing with the wafer-level manufacturing method, it is preferable mainly to restrict the upper limit of the optical index of the lens material to be used, not to use an expensive material having a high optical index, and also to reduce power variation among the respective lenses, and as to the focal length for the lens power 1/f of each lens or lens group, to appropriately distribute positive and negative values while restricting the upper limit thereof. Furthermore, it is preferable to perform the correction of the image plane excluding the image plane near the optical axis, as necessary, at the same time on each constituent aspherical surface. On the basis of the above study, in the imaging optical system according to some implementations, by satisfying the above-described configurations, it is configured such that there can be obtained an imaging optical system in which other aberrations are also preferably corrected while the image plane is kept preferably, and a small size and lightness in weight, an excellent mass productivity, and also a low cost are achieved.

DETAILED DESCRIPTION OF THE PREFERRED EMBODIMENTS

First Embodiment

Hereinafter, an imaging optical system according to a first embodiment according to some implementations will be explained with reference to the drawings.

Figure 1:
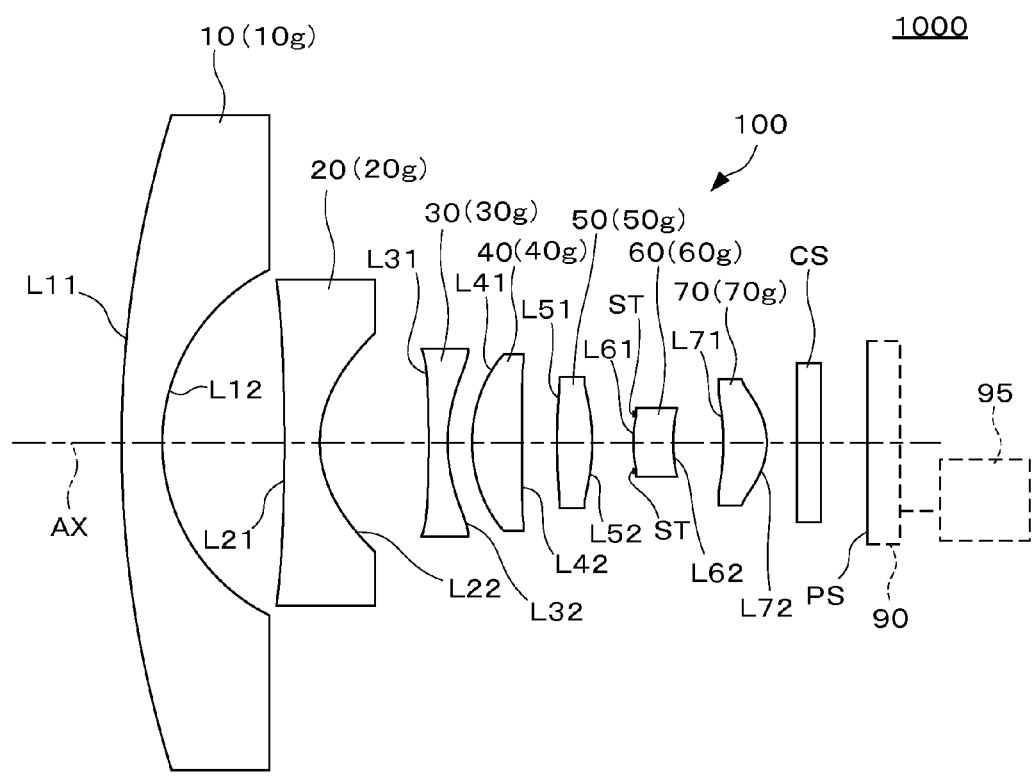
FIG. 1 is a diagram showing lenses constituting an imaging optical system in a first embodiment and Example 1.

An imaging optical system 100 shown in FIG. 1 is incorporated into imaging equipment 1000 mounted in an action camera, a car-mounted camera (rearview camera), a monitoring camera, or the like, and projects an image on an object onto an imaging device 90. Here, as the imaging device 90, such an imaging equipment 1000 uses a solid-state imaging device such as a compact CCD image sensor and a compact CMOS image sensor having a size of ½ inches or less. Meanwhile, the imaging device 90 performs an imaging action according to a drive signal from a drive circuit 95.

As shown in FIG. 1, the imaging optical system 100 is provided with the first lens 10, second lens 20, third lens 30, fourth lens 40, fifth lens 50, sixth lens 60, seventh lens 70, and an aperture stop ST which are arranged sequentially from the object side (left-hand side in FIG. 1) toward the image plane PS side (right-hand side in FIG. 1) of the imaging device 90 along an optical axis AX. That is, the first lens 10 is provided closest to the object, and the seventh lens 70 is provided closest to the image plane PS. Here, the lens number j is attached sequentially from the first lens 10. That is, the lens number of the first lens 10 is 1, the lens number of the second lens 20 is 2, and the like. In addition, here, the first to seventh lenses 10 to 70 which are single lenses constitute the lens groups, respectively. That is, the first lens 10 constitutes the first lens group 10g, the second lens 20 constitutes the second lens group 20g, the third lens 30 constitutes the third lens group 30g, the fourth lens 40 constitutes the fourth lens group 40g, the fifth lens 50 constitutes the fifth lens group 50g, the sixth lens 60 constitutes the sixth lens group 60g, and the seventh lens 70 constitutes the seventh lens group 70g. Here, the lens group number i is assumed to be counted as one group for each single lens or cemented lens from the object side. In the case of FIG. 1, since all of the lens groups are single lenses and the cemented lens does not exists, the lens group number i and the lens number j coincide with each other. That is, the lens number of the first lens group 10g constituted of the first lens 10 is 1, the lens group number of the second lens group 20g constituted of the second lens 20 is 2, and the like. However, if not a single lens but a cemented lens constituted of plural bonded lenses exists and one lens group is constituted of the cemented lens, the total number of the lens numbers becomes larger than the total number of the lens group numbers by one, for one cemented surface which is a part in which the lens surfaces of two lenses are bonded together.

The aperture stop ST is formed at or near the aperture stop position of the imaging optical system 100. In the case of FIG. 1, among the first to seventh lenses 10 to 70, the first to fifth lenses 10 to 50 are lenses or lens groups located on the object side of the aperture stop ST, that is, on the front side of the aperture stop ST, and the sixth to seventh lenses 60 and 70 are lenses or lens groups located on the image side of the aperture stop ST, that is, on the back side of the aperture stop ST. In the imaging optical system 100, there is a possibility that the characteristics of the first to seventh lens 10 to 70 become different across the boundary of the aperture stop position, and the position of the aperture stop ST is one of references in defining the shapes of the first to seventh lenses 10 to 70.

Meanwhile, while the aperture stop ST can have various shapes and structures, the aperture stop ST may be formed by providing an opaque film on a lens surface by any method of, for example, coating, printing, and sputtering.

Furthermore, in FIG. 1, the image plane PS is an image plane of the imaging optical system 100, which is a focal position obtained by the combination of the first to seventh lenses 10 to 70. Meanwhile, in this imaging optical system 100, a cover glass CS associated with the imaging device 90 is provided on the image plane PS side of the seventh lens 70.

In the imaging optical system 100, the first lens 10 is a single lens made of glass or resin and the second to seventh lenses 20 to 70 are single lenses made of resin, and the first, fourth, and sixth lenses 10, 40, and 60 are constituted of meniscus lenses in which lens surfaces on the object side are convex, the second and third lenses 20 and 30 are constituted of biconcave lenses, the fifth lens 50 is constituted of a biconvex lens, and the seventh lens 70 is constituted of a meniscus lens in which lens surfaces on the image side are convex. Among the convex or concave lens surfaces L11, L12, L21, L22, L31, L32, L41, L42, L51, L52, L61, L62, L71, and L72 which constitute the first to seventh lenses 10 to 70, any of the surfaces excluding the lens surfaces L11 and L12 which constitute the first lens 10 is an aspherical surface. Meanwhile, by causing the first lens 10 located closest to the object to be made of glass, it is possible to provide the first lens 10 with a function as a cover member for protecting the whole optical system.

The imaging optical system 100 is assumed to have F number smaller than 4 and the focal length of the whole optical system is set to $f_A$. In addition, the optical index in each of the lenses 10 to 70 is set to $n_j$, and as to each of the lenses 10 to 70, the radius of curvature of the object side surface is set to and the radius of curvature of the image side surface is set to $R_{j2}$. Furthermore, as to the lens surfaces of the biconvex lens or biconcave lens among the respective lenses, the radius of curvature on the object side is set to $R_{j1(R)}$ and the radius of curvature on the image side is set to $R_{j2(R)}$. Moreover, the aperture stop position where the aperture stop ST is located is assumed to be located between the lens having the lens number m and the lens having the lens number m+1, and the field angle is set to w. Then, the following Conditional Formulas (1), (2), (3), (4), and (5) are satisfied.

$$f_A/|f_i|<0.425 \qquad (1)$$

$$|R_{jk}|/f_A>1.5 \ (j\le m, \ k=1,2) \qquad (2)$$

$$|R_{jk(R)}|/f_A>2.0 \ (j>m, \ k=1,2) \qquad (3)$$

$$n_j<1.80 \qquad (4)$$

$$w>40° \qquad (5)$$

In the above, for the case of the optical system shown in FIG. 1, as described above, the imaging optical system 100 is constituted of seven lenses 10 to 70 which have the lens number j of 1 to 7. In addition, any of the lenses 10 to 70 is a single lens, respective single lenses constitute each of the lens groups, and the lens group number i coincides with the lens number j. Furthermore, the aperture stop ST which indicates the aperture stop position is located between the fifth lens 50 having a lens number 5 and the sixth lens 60 having a lens number 6, and m is 5.

In the example of FIG. 1, a lens corresponding to Conditional Formula (3) does not exist. That is, it is configured such that the biconvex lens or the biconcave lens does not exist on the image side of the aperture stop ST.

In addition, in order to realize an inexpensive optical system having a wider field angle and a more excellent mass productivity while keeping a preferable aberration, it is preferable to satisfy the following Conditional Formulas (1-1), (2-1), (3-1), (4-1), and (5-1).

$$f_A/|f_i|<0.40 \qquad (1\text{-}1)$$

$$|R_{jk}|/f_A>1.55 \ (j\le m, \ k=1,2) \qquad (2\text{-}1)$$

$$|R_{jk(R)}|/f_A>2.3 \ (j>m, \ k=1,2) \qquad (3\text{-}1)$$

$$n_j<1.70 \qquad (4\text{-}1)$$

$$w>50° \qquad (5\text{-}1)$$

Furthermore, when the radius of curvature on the object side of a concave lens among the respective lenses 10 to 70 is set to $R_{j1(N)}$, and the radius of curvature on the object side of a meniscus lens among the respective lenses 10 to 70 is set to $R_{j1(M)}$ and the radius of curvature on the image side thereof is set to $R_{j2(M)}$, the imaging optical system 100 satisfies the following Conditional Formulas (6) and (7).

$$|R_{j1(N)}|/f_A > 5.0 \ (j \leq m) \tag{6}$$

$$|R_{jk(M)}|/f_A > 0.5 \ (j > m, k=1,2) \tag{7}$$

Conditional Formula (6) defines the lower limit for the absolute value of the radius of curvature on the object side of the concave lens among the single lenses located on the front side of the aperture stop position, by a ratio to the focal length $f_A$ which is the focal length of the whole optical system. In addition, Conditional Formula (7) defines the lower limit for the absolute value of the radius of curvature in the meniscus lens among the single lenses located on the back side of the aperture stop position, by a ratio to the focal length $f_A$. When an optical system is caused to have a wider field angle, in particular, a concave lens located on the front side of the aperture stop position tends to have a larger size and the radius of curvature on the object side tends to become smaller, and thus aberration tends to be more easily caused, accuracy tends to become severer, and manufacturing tends to become more difficult. In addition, a meniscus lens located on the back side of the aperture stop position tends to have a smaller radius of curvature, although the power is comparatively small. Accordingly, here, the lower limit of the radius of curvature shown in Conditional Formulas (6) and (7) is set, and thus aberration generation is suppressed and also the shape to be easily manufactured is kept. In this case, by the above definition, it is possible to realize a wide lens system in which the aberration is preferably corrected and also lens manufacturing is easy. Meanwhile, the above concave lens or meniscus lens may be bonded to the adjacent lens to thereby constitute a lens group, and the meniscus lens may have a positive focal length or a negative focal length and may have zero power.

Meanwhile, in order to correct the aberration more preferably and make the manufacturing further easy, it is preferable to satisfy the following Conditional Formulas (6-1) and (7-1). Note that, in the case of the optical system having the aperture stop ST located on the first surface, that is, on the object side of the lens 10 located closest to the object, Conditional Formulas (6) and (6-1) may not be included in the conditions. In addition, in the case of the optical system in which the meniscus lens does not exist on the back side of the aperture stop ST, Conditional Formulas (7) and (7-1) may not be included in the conditions.

$$|R_{j1(N)}|/f_A > 8.0 \ (j \leq m) \tag{6-1}$$

$$|R_{jk(M)}|/f_A > 0.70 \ (j > m, k=1,2) \tag{7-1}$$

Furthermore, the imaging optical system 100 satisfies the following Conditional Formulas (8), (9), (10), and (11) when the central thickness of each lens is set to $d_j$.

$$|R_{jk}|/d_j > 1.9 \ (j \leq m, k=1,2) \tag{8}$$

$$|R_{jk(R)}|/d_j > 1.8 \ (j > m, k=1,2) \tag{9}$$

$$|R_{j1(N)}|/d_j > 7.0 \ (j \leq m) \tag{10}$$

$$|R_{jk(M)}|/d_j > 0.6 \ (j > m, k=1,2) \tag{11}$$

Any of Conditional Formulas (8) to (11) indicates that the radius of curvature is kept large so as to satisfy the definition, or the central thickness is reduced so as to satisfy the definition, for the single lens. For example, when the wafer level manufacturing is considered, a lens having a small thickness to some extent and having a gentle curve is preferable from the viewpoint of ease of manufacturing and manufacturing capability. That is, a small lens thickness and a large radius of curvature are preferable. On the other hand, the whole optical system is desired to have preferable optical performance for functioning as a wide lens. In contrast to this, according to the conditions of the above Formulas (8) to (11), by defining differently the lens shape of the lens located on the front side of the aperture stop position, the lens shape of the biconvex lens or the biconcave lens located on the backside of the aperture stop position, the radius of curvature on the object side of the concave lens located on the front side of the aperture stop position, and the lens shape of the meniscus lens located on the back side of the aperture stop position, it is possible to realize a lens shape which keeps a preferable aberration and is easily manufactured. In particular, by individually defining the lens shapes for the biconvex lens and the biconcave lens located on the back side of the aperture stop position in Conditional Formula (9), it is possible to keep a preferable aberration.

Meanwhile, the above-described central thickness (lens thickness) $d_j$ indicates a thickness of each lens at the center, and means the central thickness in each of the respective single lenses when the cemented lens is divided into individual constituent single lenses, in the case where the lens group is not a single lens but a cemented lens.

Further, in order to correct the aberration more preferably and make the manufacturing easier, it is preferable to satisfy the following Conditional Formulas (8-1), (9-1), (10-1), and (11-1). Meanwhile, in the case of the optical system in which the aperture stop ST is located at the first surface, that is, on the object side of the lens 10 located closest to the object, Conditional Formulas (8), (10), (8-1), and (10-1) may not be included in the conditions. In addition, in the case of the optical system in which the biconvex lens or the biconcave lens does not exist on the back side of the aperture stop ST, Conditional Formulas (9) and (9-1) may not be included in the conditions. Furthermore, in the optical system in which the concave lens does not exist on the front side of the aperture stop ST, Conditional Formula (10) and (10-1) may not be included in the conditions. Moreover, in the optical system in which the meniscus lens does not exist on the back side of the aperture stop ST, Conditional Formulas (11) and (11-1) may not be included in the conditions. In the example of FIG. 1, as described above, the biconvex lens or the biconcave lens does not exist on the image side of the aperture stop ST. That is, a lens corresponding to Conditional Formulas (9) and (9-1) does not exist.

$$|R_{jk}|/d_j > 2.2 \ (j \leq m, k=1,2) \tag{8-1}$$

$$|R_{jk(R)}|/d_j > 2.5 \ (j > m, k=1,2) \tag{9-1}$$

$$|R_{j1(N)}|/d_j > 10.0 \ (j \leq m) \tag{10-1}$$

$$|R_{jk(M)}|/d_j > 1.0 \ (j > m, k=1,2) \tag{11-1}$$

Further, when, among the central thicknesses $d_j$ of the respective lenses 10 to 70 in the imaging optical system 100, the largest thickness is set to $d_{max}$ and the smallest thickness is set to $d_{min}$, and when the minimum value of air gaps between the lenses is set to $da_{min}$, the lens entire length is set to L, and the maximum image height is set to y, the following Conditional Formulas (12), (13), (14), (15), and (16) are satisfied. Meanwhile, the air gap is spacing between a lens and the adjacent lens and the aperture stop is excluded.

$$(d_{max} - d_{min})/f_A < 1.0 \tag{12}$$

$$d_{min}/d_{max} > 0.25 \tag{13}$$

$$d_{max}/f_A < 1.50 \tag{14}$$

$$1.0 > da_{min}/f_A > 0.05 \tag{15}$$

$$L/2y < 7 \tag{16}$$

Conditional Formula (12) defines the maximum difference among the central thicknesses (lens thicknesses) of the single lenses by a ratio to the focal length $f_A$ of the whole optical system. Conditional Formula (13) defines the ratio of the minimum value $d_{min}$ to the maximum value $d_{max}$ among the lens thicknesses. Conditional Formula (14) defines the maximum value $d_{max}$ of the lens thicknesses by a ratio to the focal length $f_A$ of the whole optical system. Conditional Formula (15) defines a range of the minimum air gap by a ratio to the focal length $f_A$. Conditional Formula (16) defines the ratio of the lens entire length L to the maximum image height y. The above Conditional Formulas (12) to (16) show conditions which enable a compact configuration of the optical system and also enable a mass production at a low cost in response to the wafer-level manufacturing method, by defining the thickness variation and the maximum thickness of the respective lenses. Meanwhile, the above described central thickness (lens thickness) $d_j$ indicates a thickness of each lens at the center, and in the case where the lens group is not a single lens but a cemented lens, means the central thickness in each of the respective single lenses when the cemented lens is divided into constituent individual single lenses.

Meanwhile, in order to make the optical system more compact and the wafer level manufacturing easier, it is preferable to satisfy the following Conditional Formulas (12-1), (13-1), (14-1), (15-1), and (16-1).

$$(d_{max} - d_{min})/f_A < 0.70 \tag{12-1}$$

$$d_{min}/d_{max} > 0.35 \tag{13-1}$$

$$d_{max}/f_A < 1.15 \tag{14-1}$$

$$1.0 > da_{min}/f_A > 0.07 \tag{15-1}$$

$$L/2y < 4.75 \tag{16-1}$$

In Formula (15) or (15-1) among the above conditional formulas, provision of not only a lower limit but also an upper limit as to $da_{min}$ prevents the gap from becoming too large and the whole optical system from becoming large. Meanwhile, while the lens entire length L is a distance from the object side surface of the first lens to the image plane, in the case where an optical device constituted of a plane parallel plate such as a low-pass filter and a cover glass is inserted between the end surface of the lenses and the image plane, there is used a value obtained by converting this part into air.

Furthermore, in still another aspect according to some implementations, by the combinational use of a plurality of materials different in the optical index, Abbe number, and thermal characteristics from a single lens, at least any of field curvature, color aberration, and temperature aberration is included in a predetermined range.

For example, for the correction of the field curvature, it is possible to reduce the petzval sum shown by Conditional Formula (17) and make the amount of field curvature smaller by using a material having a high optical index as the convex lens and using a material having a low optical index as the concave lens, among the constituent lenses. Furthermore, as to the correction of the color aberration, it is possible to reduce a focal point difference caused by light wavelength by using a material having a larger Abbe number as the convex lens and using a material having a smaller Abbe number as the concave lens. As to the correction of the temperature aberration, it is possible to reduce a focal point difference by temperature change by using a lens material having a small amount of change of optical index caused by temperature, as the material for the convex lens and by using a material having a large amount of change of optical index caused by temperature, as the material of the concave lens. By combined use of a plurality of materials in accordance with a difference in accuracy or the like required depending on the application of the optical system, it is possible to manufacture an imaging optical system in which an optical system has a small size and lightness in weight and also has excellent mass productivity and a low cost while keeping excellent optical performance of a wide field angle that is a total angle of view of 80 degrees or more. Meanwhile, the lens material constituting the aspherical surface is preferably a resin material from the viewpoint of low cost lens manufacturing.

Hereinafter, a manufacturing method of the respective lenses 10 to 70 will be explained. The lenses 10 to 70 are manufactured by a casting process. In the casting process, a glass substrate is not necessary. Specifically, ultraviolet cure resin, thermoset resin, or the like is poured into a mold having a lens molding surface and the resin is hardened by heating, ultraviolet irradiation, or the like. Since a resin having a high hardness is used, a molding surface of a lens edge can be provided for the mold, and the lens and the edge are formed integrally and thus a spacer becomes unnecessary. By the use of a mold having many lens molding surfaces, there is obtained a wafer-state lens group in which many lenses are formed at a time. By overlapping the wafer-state lenses 10 to 70 with one another and further overlapping a wafer in which the many imaging devices 90 are formed, it is possible to form many imaging systems at a time. The individual imaging system can be obtained by cutting out the many imaging systems.

According to the imaging optical system 100 explained above, each of the plural lenses 10 to 70 constituting the imaging optical system 100 has a radius of curvature and a focal length within the ranges defined to the focal length of the whole optical system and also has an optical index within the determined range, and also a half or more than half of all the respective lenses 10 to 70 have aspherical surfaces. Therefore, it is possible to manufacture an imaging optical system in which an optical system has a small size and lightness in weight and also has an excellent mass productivity and a low cost while keeping high optical performance of a wide field angle, for example, a total angle of view (2w) of 80 degrees or more. In particular, by satisfying the above Formulas (1) to (5), the absolute value of the power in each lens group is suppressed to be small, and there are defined the surface shape of the lens on the front side of the aperture stop which tends to have a radius of curvature smaller than the focal length of the whole optical system in a wide lens and the surface shape of the biconvex lens or biconcave lens on the back side of the aperture stop, and thus it is possible to suppress the generation of the aberration to thereby obtain a preferable aberration and to obtain a lens shape which is easily manufactured. At the same time, by not using an optical material having a high optical index, it is possible to realize an inexpensive optical system.

Moreover, by satisfying each of the above described conditional formulas, it is possible to realize a wider field angle and improved thermal characteristics other than a small size and lightness in weight and a high resolution. While all the lens shape can be obtained by the wafer level manufacturing method, in the case of the lens 10 being made of glass, the lenses 20 to 70 manufactured in the wafer level may be combined with the lens 10 manufactured in an ordinary method. Furthermore, it is possible to make the lens reflowable, by forming the lens with the use of a material having resistance to a solder reflow temperature.

Example 1

Hereinafter, there will be explained Example 1 in which the imaging optical system 100 shown in FIG. 1 is numerically defined. The following Table 1 shows lens data of the imaging optical system 100 in Example 1. Meanwhile, FIG. 1 also shows the lenses in Example 1.

$$Z = \frac{cr^2}{1 + \sqrt{1 - (1+k)c^2 r^2}} + \alpha_3 r^3 + \ldots + \alpha_m r^m \quad \text{Formula 1}$$

In the present Example 1, each value of the coefficients k and $\alpha_3$ to $\alpha_m$ in the above aspherical formula is shown in Table 1. Meanwhile, in the lower column of Table 1, the aspherical data is represented by the use of a power of 10 "E".

TABLE 1

| s-n | R | d | nd | ν |
|---|---|---|---|---|
| 1 | 19.8696 | 0.75 | 1.51633 | 64.07 |
| 2 | 3.5135 | 2.2516 | | |
| 3* | −38.266 | 0.65 | 1.48749 | 70.24 |
| 4* | 2.0441 | 2.0049 | | |
| 5* | −31.2046 | 0.35 | 1.49660 | 55.71 |
| 6* | 2.9915 | 0.4502 | | |
| 7* | 2.6561 | 0.92 | 1.54917 | 34.65 |
| 8* | 2025.986 | 0.6446 | | |
| 9* | 10.4629 | 0.65 | 1.49660 | 55.71 |
| 10* | −3.3986 | 0.7563 | | |
| 11S | Infinity | 0 | | |
| 12* | 2.5893 | 0.735 | 1.49660 | 55.71 |
| 13* | 3.3355 | 0.9197 | | |
| 14* | −5.734 | 0.805 | 1.49660 | 55.71 |
| 15* | −1.197 | 0.5533 | | |
| 16 | Infinity | 0.4427 | 1.52308 | 58.57 |
| 17 | Infinity | 0.8458 | | |

| | aspherical coefficient | | | | |
|---|---|---|---|---|---|
| s-n | c-c | 4th | 6th | 8th | 10th |
| 3 | 99.2166 | 8.7635E−05 | −1.1277E−05 | −1.2761E−06 | 2.1479E−08 |
| 4 | −0.756 | 3.7427E−04 | −2.9575E−04 | −4.2577E−05 | −1.7225E−06 |
| 5 | 70.6001 | −1.4871E−03 | −1.3311E−03 | −1.9180E−04 | −8.8441E−05 |
| 6 | −0.5776 | −1.8238E−03 | 5.4686E−04 | −7.8234E−04 | −3.2071E−04 |
| 7 | 0.2135 | 3.2228E−04 | 1.8606E−04 | 3.8017E−04 | −1.1788E−05 |
| 8 | 100.3326 | 2.0149E−03 | 6.2383E−04 | −3.0196E−04 | 3.7798E−04 |
| 9 | 16.9326 | −1.9480E−03 | −1.5001E−02 | 9.8887E−03 | −2.5081E−03 |
| 10 | −11.5949 | −2.7498E−02 | 5.0298E−02 | −4.7138E−02 | 1.8945E−02 |
| 12 | −4.3842 | 1.6677E−01 | −5.0612E−01 | 5.0574E−01 | 1.9568E+00 |
| 13 | 15.5319 | 1.4893E−01 | −1.1739E+00 | 4.3010E+00 | −6.0263E+00 |
| 14 | 30.0048 | −1.2698E−02 | −5.2056E−02 | 1.1709E−01 | 1.1980E−03 |
| 15 | −0.2246 | 1.4046E−01 | −1.4278E−01 | 1.0900E−01 | 2.0444E−03 | focal length 0.9055
F number 2.81
field angle w 92°
image height y 1.786
*aspherical
S aperture stop
"s-n" means surface number.
"c-c" means conic constant.

In the upper column of Table 1, "surface number" is a number attached to each surface of the lenses 10 to 70 and the aperture stop ST sequentially from the object side. In addition, "R" indicates the radius of curvature, "d" represents spacing to the next plane. Moreover, "nd" indicates an optical index of a material at d-line, and "ν" represents Abbe number of a lens material.

In the present Example 1, among the respective lenses 10 to 70, lenses 20 to 70 excluding the lens 10 are formed of aspherical surfaces. Each displacement amount Z of these aspherical surface shapes from the surface vertexes in the optical axis direction is represented by the following formula when c represents the inverse number of a radius of curvature, r represents a height from the optical axis, k represents a conic constant, and $\alpha_m$ represents an mth-order aspherical coefficient.

As shown in the upper column of Table 1, the specification of the imaging optical system 100 in the present Example 1 is as follows: focal length $f_A$=0.9055 (mm), F number Fno=2.81, and field angle (semi-field angle) w=92 degrees (i.e., total angle of view=184 degrees). In this condition, the image height y becomes 1.786 (mm). Furthermore, condition values for the above Conditional Formula (1) to (16) in the present Example 1 are shown in the following Table 2. In this case, as described above, because of an optical system in which the biconvex lens or the biconcave lens does not exist on the back side of the aperture stop ST, the values of $R_{jk(R)}$ (j>m, k=1 and 2) is not supposed to exist and the condition values for the Conditional Formulas (3) and (9) do not exist. Specifically, as described above, the second lens 20 and the like are concave lenses among the lenses located on the front side of the aperture stop ST. Moreover, the sixth lens 60 and the like located on the back side of the aperture stop ST are meniscus lenses. Accordingly, although the condition values for Conditional Formula (3) and (9) do not exist, the condition values except these values exist. Meanwhile, in Table 2 and the following tables, a hyphen (-) is described for a value which does not exist (for a portion where a corresponding lens does not exist). As apparent from Table 2, all of the condition values except for Conditional Formulas (3) and (9) satisfy the respective conditional formulas. In addition, the condition values for more preferable Conditional Formulas (1-1) to (16-1) also satisfy all of the respective Conditional Formulas excluding Conditional Formulas (3-1) and (9-1) in which the condition values do not exist.

TABLE 2 nj maximum 1.54917
w 92°
L/2y 3.80

| | | | |
|---|---|---|---|
| fA | 0.9095 | fA/fi | |
| f1 | −8.3975 | | −0.1083 |
| f2 | −3.9596 | | −0.2297 |
| f3 | −5.4784 | | −0.166 |
| f4 | 4.8422 | | 0.1878 |
| f5 | 5.2475 | | 0.1733 |
| f6 | 17.5664 | | 0.0518 |
| f7 | 2.8769 | | 0.3162 |
| f8 | — | | — |
| \|Rjk\|/fA minimum | j ≤ m, k = 1, 2 | | 2.2474 |
| \|Rjk(R)\|/fA minimum | j > m, k = 1, 2 | | — |
| \|Rj1(N)\|/fA minimum | j ≤ m | | 21.8459 |
| \|Rjk(M)\|/fA minimum | j > m, k = 1, 2 | | 1.3160 |
| \|Rjk\|/dj minimum | j ≤ m, k = 1, 2 | | 2.8871 |
| \|Rjk(R)\|/dj minimum | j > m, k = 1, 2 | | — |
| \|Rj1(N)\|/dj minimum | j ≤ m | | 26.4928 |
| \|Rjk(M)\|/dj minimum | j > m, k = 1, 2 | | 1.4869 |
| (dmax − dmin)/fA | | | 0.6267 |
| dmin/dmax | | | 0.3804 |
| dmax/fA | | | 1.0115 |
| damin/fA | | | 0.4950 |

Figure 2A:
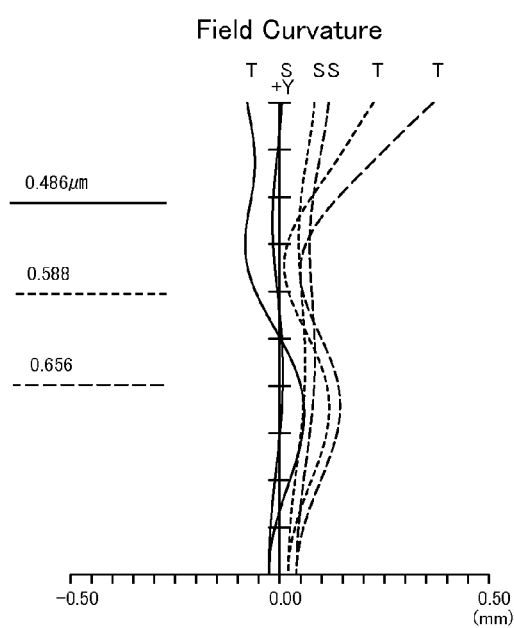
FIG. 2A is a diagram showing a field curvature of lenses in Example 1.
Figure 2B:
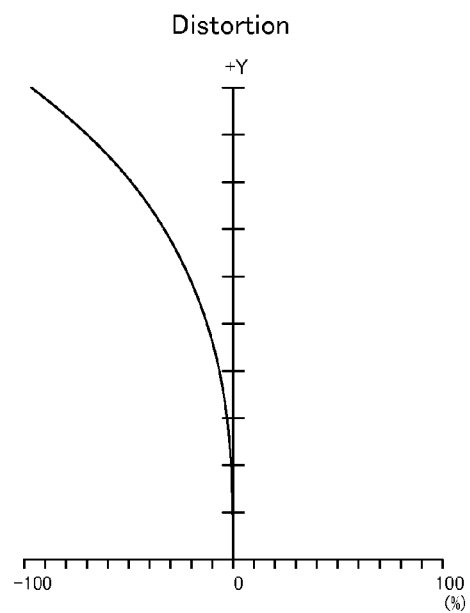
FIG. 2B is a distortion chart of lenses in Example 1.

FIG. 2A shows field curvatures of respective colors at the standard wavelength of 588 nm and the other wavelengths of 656 nm and 486 nm in the image plane PS of the present Example 1, and FIG. 2B shows distortion at the standard wavelength of 588 nm in the image plane PS.

Second Embodiment

Hereinafter, an imaging optical system according to a second embodiment will be explained. Meanwhile, the imaging optical system according to the second embodiment is a modification of the imaging optical system of the first embodiment and the part which is not explained in particular is the same as the part in the first embodiment.

Figure 3:
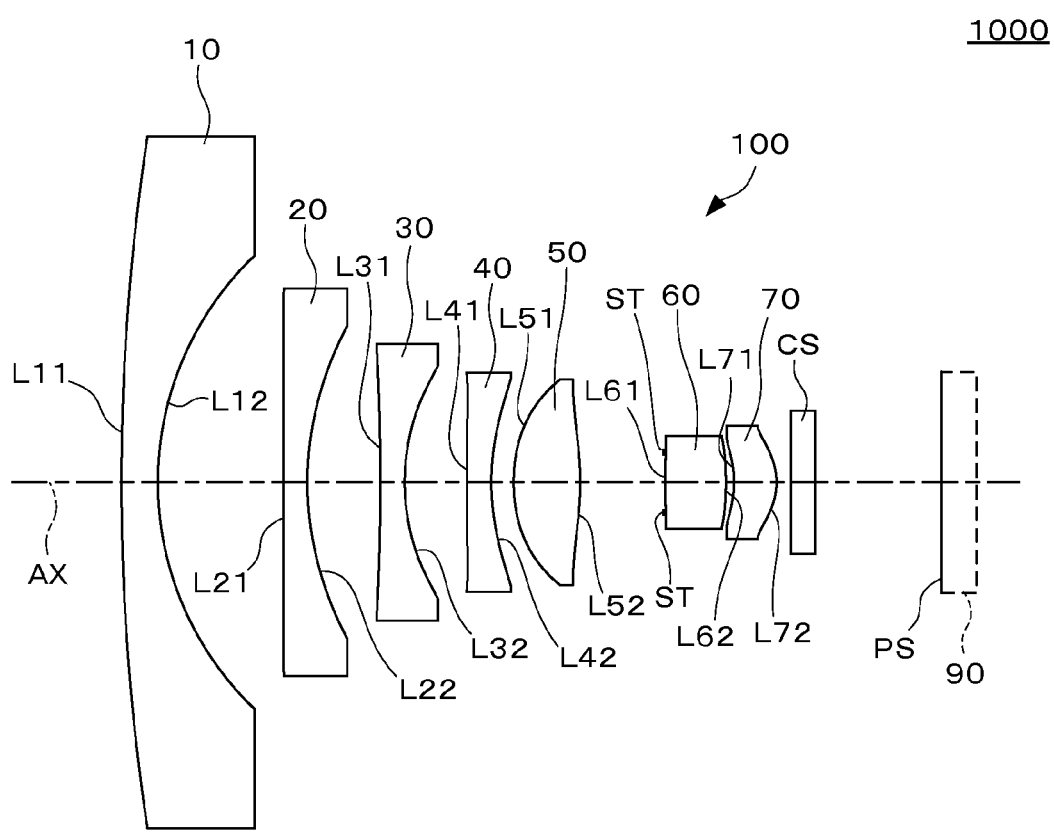
FIG. 3 is a diagram showing lenses constituting an imaging optical system in a second embodiment and Example 2.

As shown in FIG. 3, the imaging optical system 100 of the present embodiment is constituted of seven lenses 10 to 70 and the lens number j is a number from 1 to 7. Furthermore, any of the lenses 10 to 70 is a single lens, the respective single lenses constitute each of lens groups, and the lens group number i coincides with the lens number j. Moreover, the aperture stop ST indicating the aperture stop position is located between the fifth lens 50 having a lens number 5 and the sixth lens 60 having a lens number 6, and m is 5.

In the imaging optical system 100 shown in FIG. 3, the lenses 20 to 70 except the lens 10 are aspherical lenses. In addition, the first lens 10 to the fourth lens 40 located on the front side of the aperture stop ST are concave lenses. Furthermore, the sixth lens 60 located on the back side of the aperture stop ST is a biconvex lens, and the seventh lens 70 is a meniscus lens. Accordingly, in the case of FIG. 3, the conditions are required to satisfy all Conditional Formulas (1) to (16).

Example 2

Hereinafter, there will be explained Example 2 in which the imaging optical system 100 shown in FIG. 3 is defined numerically. The following Table 3 shows lens data of the imaging optical system 100 in Example 2. Meanwhile, the signs in Table 3 are the same as those in Table 1. Here, FIG. 3 also shows lenses of Example 2.

TABLE 3

| s-n | R | d | nd | ν |
|---|---|---|---|---|
| 1 | 37.8569 | 0.6 | 1.51633 | 64.07 |
| 2 | 5.1446 | 2.0642 | | |
| 3* | 595.5718 | 0.4 | 1.49660 | 55.71 |
| 4* | 5.1399 | 1.2024 | | |
| 5* | −42.6048 | 0.4 | 1.49660 | 55.71 |
| 6* | 3.3491 | 1.0283 | | |
| 7* | 166.5589 | 0.4 | 1.49660 | 55.71 |
| 8* | 3.8954 | 0.3678 | | |
| 9* | 2.7811 | 1.1 | 1.54917 | 34.65 |
| 10* | −4.3259 | 1.3958 | | |
| 11S | Infinity | 0 | | |
| 12* | 7.8425 | 1 | 1.49660 | 55.71 |
| 13* | −5.8512 | 0.1370 | | |
| 14* | −1.7227 | 0.7 | 1.49660 | 55.71 |
| 15* | −1.0318 | 0.2395 | | |
| 16 | Infinity | 0.4 | 1.52308 | 58.57 |
| 17 | Infinity | 2.0789 | | |

| aspherical coefficient | | | | | |
|---|---|---|---|---|---|
| s-n | c-c | 4th | 6th | 8th | 10th |
| 3 | 54.1738 | 0 | 0 | 0 | 0 |
| 4 | −0.2941 | −3.8815E−04 | −3.5844E−05 | 6.6871E−07 | 8.6996E−07 |
| 5 | 96.1592 | 0 | 0 | 0 | 0 |
| 6 | −20.4668 | 3.6482E−02 | −5.9396E−03 | 5.8619E−04 | −7.4752E−05 |
| 7 | 100.0067 | 1.9537E−03 | −2.2867E−04 | −1.5608E−04 | −3.7977E−05 |

TABLE 3-continued

| 8 | −1.5204 | −4.2559E−03 | 2.0644E−04 | 2.0163E−05 | −5.0736E−05 |
| 9 | 0.2376 | 2.4595E−02 | −2.0426E−03 | 4.5756E−04 | −3.1430E−05 |
| 10 | −15.4770 | 2.1328E−02 | −2.6205E−03 | −5.5080E−04 | 1.9195E−04 |
| 12 | 84.0513 | −1.2550E−01 | −4.5890E−02 | −3.6146E−01 | 1.3482E+00 |
| 13 | −2.4547 | −1.8066E−02 | −1.3003E−01 | −1.4023E−01 | 4.5001E−01 |
| 14 | −0.8147 | 1.2333E−02 | 1.1958E−01 | 8.4117E−02 | 1.0741E−01 |
| 15 | −1.4170 | −7.2970E−03 | 3.6456E−02 | 7.0274E−02 | 3.2680E−02 | focal length 1.1328
F number 2.97
field angle w 82°
image height y 1.828
*aspherical
S aperture stop As shown in the upper column of Table 3, the specification of the imaging optical system 100 in the present Example 2 is as follows: focal length $f_A$=1.1328 (mm), F number Fno=2.97, and field angle (semi-field angle) w=82 degrees. In this condition, the image height y becomes 1.828 (mm). Furthermore, the condition values for the above Conditional Formulas (1) to (16) in the present Example 2 are shown in the following Table 4. In this case, all of the condition values for Conditional Formulas (1) to (16) satisfy the respective conditional formulas. In addition, the condition values for more preferable Conditional Formulas (1-1) to (16-1) also satisfy all of the respective Conditional Formulas.

TABLE 4

| nj maximum 1.54917 | | |
| w 82° | | |
| L/2y 3.658 | | |
| --- | --- | --- |
| fA | 1.1328 | fA/fi |
| f1 | −11.6032 | −0.0976 |
| f2 | −10.4427 | −0.1085 |
| f3 | −6.2347 | −0.1817 |
| f4 | −8.0386 | −0.1409 |
| f5 | 3.2614 | 0.3473 |
| f6 | 6.9156 | 0.1638 |
| f7 | 3.8771 | 0.2922 |
| f8 | — | — |
| \|Rjk\|/fA minimum | j ≤ m, k = 1, 2 | 2.4551 |
| \|Rjk(R)\|/fA minimum | j > m, k = 1, 2 | 5.1654 |
| \|Rj1(N)\|/fA minimum | j ≤ m | 33.4201 |
| \|Rjk(M)\|/fA minimum | j > m, k = 1, 2 | 0.9108 |
| \|Rjk\|/dj minimum | j ≤ m, k = 1, 2 | 2.5282 |
| \|Rjk(R)\|/dj minimum | j > m, k = 1, 2 | 5.8512 |
| \|Rj1(N)\|/dj minimum | j ≤ m | 63.0948 |
| \|Rjk(M)\|/dj minimum | j > m, k = 1, 2 | 1.4740 |
| (dmax − dmin)/fA | | 0.6180 |
| dmin/dmax | | 0.3636 |

Figure 4A:
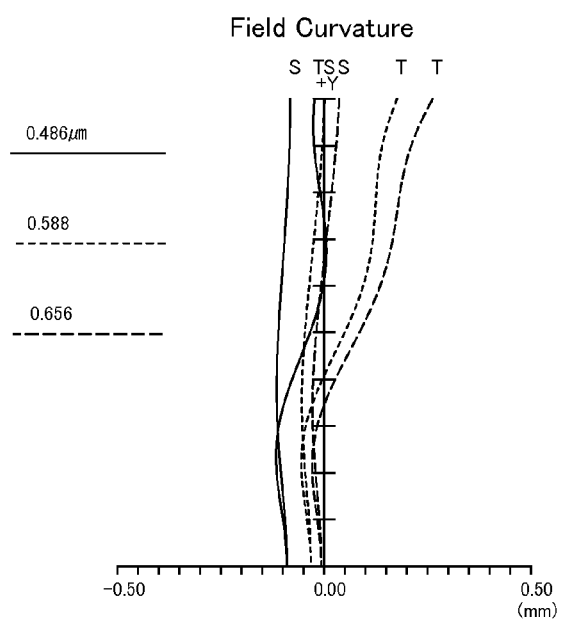
FIG. 4A is a diagram showing a field curvature of lenses in Example 2.
Figure 4B:
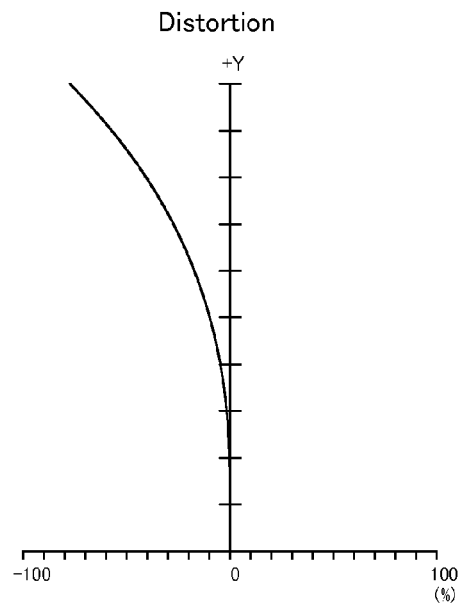
FIG. 4B is a distortion chart of lenses in Example 2.

FIG. 4A shows field curvatures of respective colors at the standard wavelength of 588 nm and the other wavelengths of 656 nm and 486 nm in the image plane PS of the present Example 2, and FIG. 4B shows distortion at the standard wavelength of 588 nm in the image plane PS.

Third Embodiment

Hereinafter, an imaging optical system according to a third embodiment will be explained. Meanwhile, the imaging optical system according to the third embodiment is a modification of the imaging optical system of the first embodiment, and the part which is not explained in particular is the same as the part in the first embodiment.

Figure 5:
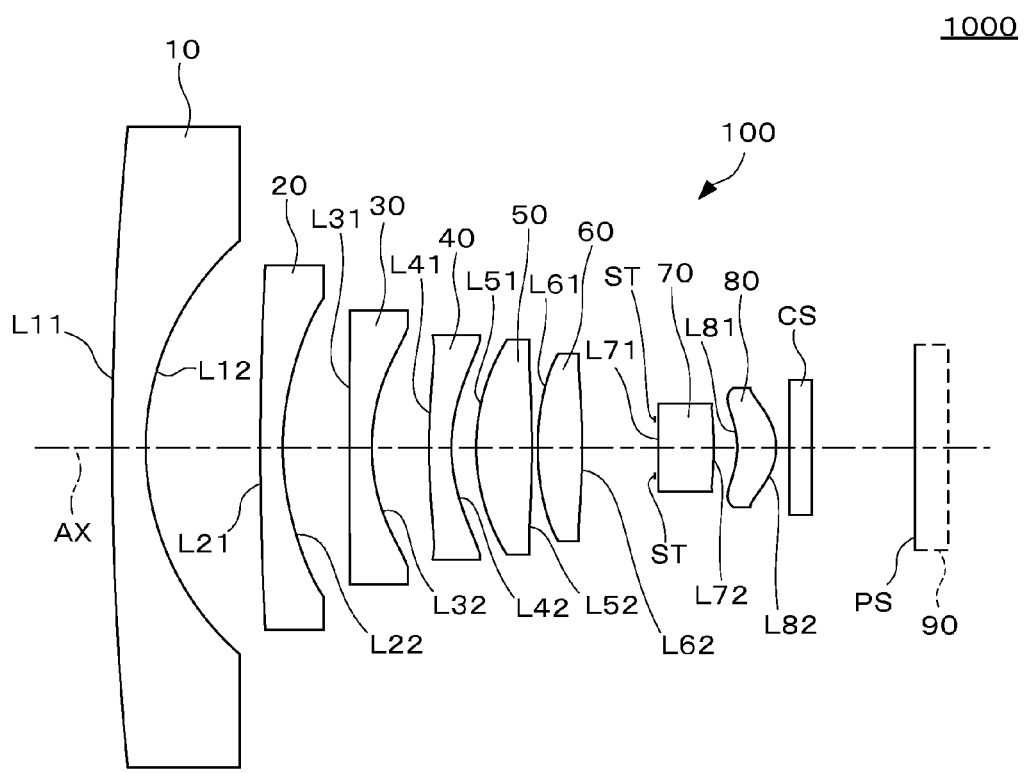
FIG. 5 is a diagram showing lenses constituting a third embodiment and Example 3.

As shown in FIG. 5, the imaging optical system 100 of the present embodiment is constituted of eight lenses 10 to 80, and the lens number j is a number from 1 to 8. Meanwhile, as shown in the drawing, the eighth lens 80 is constituted of lens surfaces L81 and L82. Furthermore, any of the lenses 10 to 80 is a single lens, the respective single lenses constitute each of lens groups, and the lens group number i coincides with the lens number j. Moreover, the aperture stop ST indicating the aperture stop position is located between the sixth lens 60 having a lens number 6 and the seventh lens 70 having a lens number 7, and m is 6.

In the imaging optical system 100 shown in FIG. 5, the lenses 20 to 80 except the lens 10 are aspherical lenses. In addition, the first lens 10 to the fourth lens 40 located on the front side of the aperture stop ST are concave lenses. Furthermore, the seventh lens 70 located on the back side of the aperture stop ST is a biconvex lens, and the eighth lens 80 is a meniscus lens. Accordingly, in the case of FIG. 5, the conditions are required to satisfy all Conditional Formulas (1) to (16).

Example 3

Hereinafter, there will be explained Example 3 in which the imaging optical system 100 shown in FIG. 5 is defined numerically. The following Table 5 shows lens data of the imaging optical system 100 in Example 3. Meanwhile, the signs in Table 5 are the same as those in Table 1. Note that FIG. 5 also shows lenses of Example 3.

TABLE 5

| s-n | R | d | nd | ν |
| --- | --- | --- | --- | --- |
| 1 | 59.9922 | 0.6 | 1.51633 | 64.07 |
| 2 | 4.9280 | 2.0564 | | |
| 3* | 62.7655 | 0.4 | 1.49660 | 55.71 |
| 4* | 5.0030 | 1.1958 | | |
| 5* | 369.6825 | 0.4 | 1.49660 | 55.71 |
| 6* | 3.4779 | 1.0267 | | |
| 7* | 14.2396 | 0.4 | 1.49660 | 55.71 |
| 8* | 2.8868 | 0.4441 | | |
| 9* | 3.7211 | 1 | 1.54917 | 34.65 |

TABLE 5-continued

| | | | | |
|---|---|---|---|---|
| 10* | −17.4374 | 0.1 | | |
| 11* | 4.4265 | 0.8 | 1.54917 | 34.65 |
| 12* | −12.5612 | 1.3582 | | |
| 13S | Infinity | 0 | | |
| 14* | 12.7464 | 1 | 1.49660 | 55.71 |
| 15* | −4.5547 | 0.4182 | | |
| 16* | −1.5615 | 0.7 | 1.49660 | 55.71 |
| 17* | −0.9995 | 0.2395 | | |
| 18 | Infinity | 0.4 | 1.52308 | 58.57 |
| 19 | Infinity | 1.8465 | | | aspherical coefficient

| s-n | c-c | 4th | 6th | 8th | 10th |
|---|---|---|---|---|---|
| 3 | 20.7287 | 0 | 0 | 0 | 0 |
| 4 | −0.7227 | −1.1542E−03 | −5.7571E−05 | 9.3342E−06 | 2.9005E−06 |
| 5 | −100.0365 | 0 | 0 | 0 | 0 |
| 6 | −16.4489 | 3.4319E−02 | −6.0559E−03 | 6.1740E−04 | −6.6158E−05 |
| 7 | −19.3160 | 1.9141E−03 | −3.4968E−04 | −1.7598E−04 | −2.7712E−05 |
| 8 | −1.6115 | −4.5131E−03 | 2.2691E−04 | −9.3339E−06 | −5.6819E−05 |
| 9 | 0.2385 | 5.8098E−04 | −1.0865E−04 | −7.3811E−09 | −3.5664E−06 |
| 10 | −57.2382 | 1.3349E−03 | 3.0703E−04 | −3.4729E−06 | 3.0714E−05 |
| 11 | −0.3687 | −2.1709E−04 | 1.7597E−04 | 2.4013E−04 | 1.4416E−04 |
| 12 | −23.5855 | 1.0787E−03 | 1.4682E−05 | 3.6648E−04 | 1.1364E−04 |
| 14 | 100.0411 | −9.2202E−02 | 3.1017E−01 | 3.3310E−01 | −4.0784E+00 |
| 15 | −78.5422 | 2.6988E−02 | −1.0152E−01 | −1.0120E−01 | 5.1525E−01 |
| 16 | −0.6878 | 6.0504E−03 | 1.1317E−01 | 4.7428E−02 | 2.7815E−02 |
| 17 | −1.1670 | −3.3903E−02 | 5.1146E−03 | 4.9314E−02 | 1.4056E−02 | focal length 1.1306
F number 2.88
field angle w 82°
image height y 1.827
*aspherical
S aperture stop As shown in the upper column of Table 5, the specification of the imaging optical system 100 in the present Example 3 is as follows: focal length $f_A$=1.1306 (mm), F number Fno=2.88, and field angle (semi-field angle) w=82 degrees. In this condition, the image height y becomes 1.827 (mm). Furthermore, the condition values for the above Conditional Formulas (1) to (16) in the present Example 3 are shown in the following Table 6. In this case, all of the condition values for Conditional Formulas (1) to (16) satisfy the respective conditional formulas. In addition, the condition values for more preferable Conditional Formulas (1-1) to (16-1) also satisfy all of the respective Conditional Formulas.

TABLE 6

| nj maximum 1.54917 w 82° L/2y 3.899 | | |
|---|---|---|
| fA | 1.1306 | fA/fi |
| f1 | −10.4371 | −0.1083 |
| f2 | −10.9723 | −0.1030 |
| f3 | −7.0726 | −0.1599 |
| f4 | −7.3777 | −0.1532 |
| f5 | 5.6793 | 0.1991 |
| f6 | 6.0612 | 0.1865 |
| f7 | 6.8893 | 0.1641 |
| f8 | 3.9573 | 0.2857 |
| \|Rjk\|/fA minimum | j ≦ m, k = 1, 2 | 2.5534 |
| \|Rjk(R)\|/fA minimum | j > m, k = 1, 2 | 4.0285 |
| \|Rj1(N)\|/fA minimum | j ≦ m | 12.5948 |
| \|Rjk(M)\|/fA minimum | j > m, k = 1, 2 | 0.8841 |
| \|Rjk\|/dj minimum | j ≦ m, k = 1, 2 | 3.7211 |
| \|Rjk(R)\|/dj minimum | j > m, k = 1, 2 | 4.5547 |
| \|Rj1(N)\|/dj minimum | j ≦ m | 35.5991 |
| \|Rjk(M)\|/dj minimum | j > m, k = 1, 2 | 1.4279 |
| (dmax − dmin)/fA | | 0.5307 |
| dmin/dmax | | 0.4000 |
| dmax/fA | | 0.8845 |
| damin/fA | | 0.0884 |

Figure 6A:
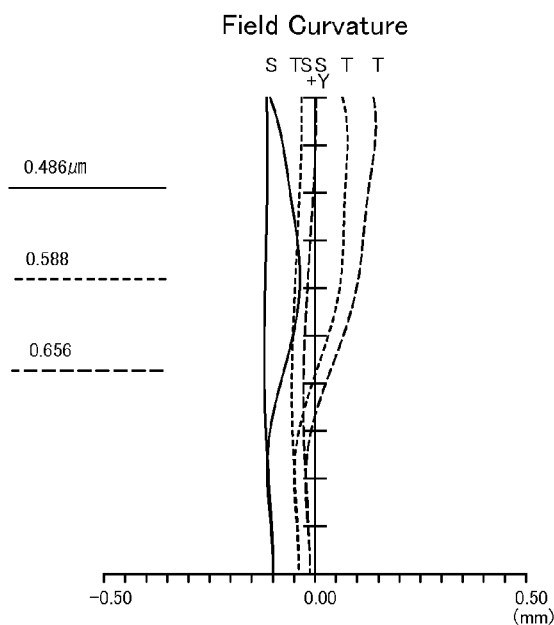
FIG. 6A is a diagram showing a field curvature of lenses in Example 3.
Figure 6B:
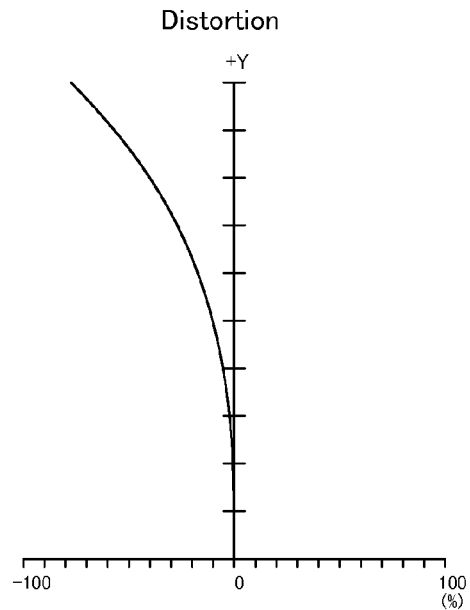
FIG. 6B is a distortion chart of lenses in Example 3.

FIG. 6A shows field curvatures of respective colors at the standard wavelength of 588 nm and the other wavelengths of 656 nm and 486 nm in the image plane PS of the present Example 3, and FIG. 6B shows distortion at the standard wavelength of 588 nm in the image plane PS.

Fourth Embodiment

Hereinafter, an imaging optical system according to a fourth embodiment will be explained. Meanwhile, the imaging optical system according to the fourth embodiment is a modification of the imaging optical system of the first embodiment and the part which is not explained in particular is the same as the part in the first embodiment.

Figure 7:
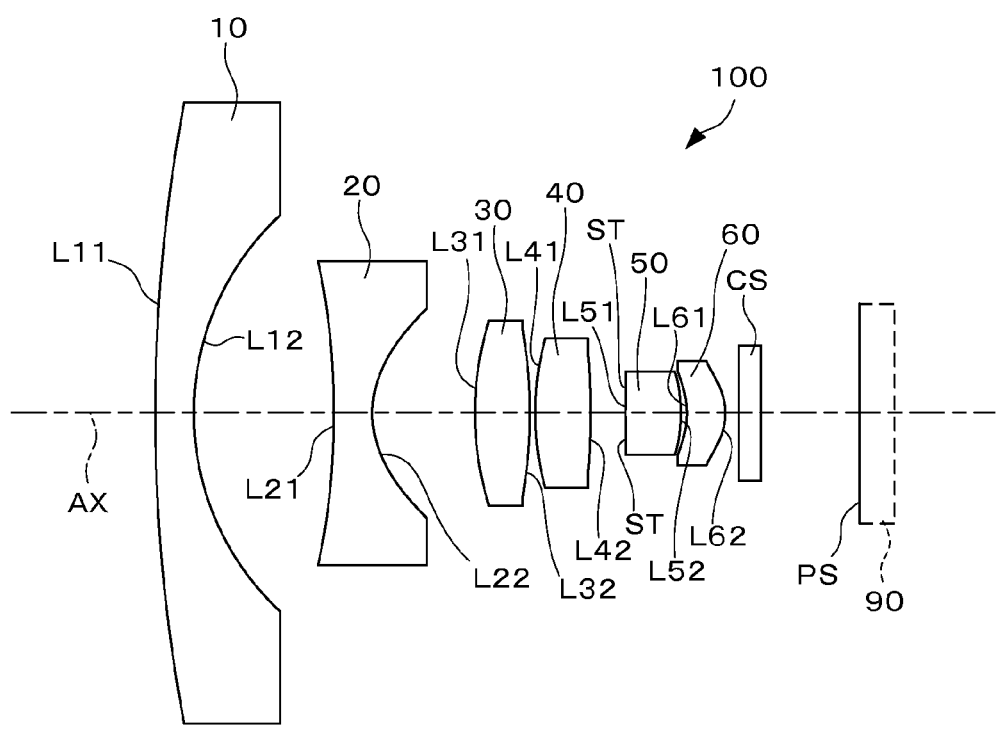
FIG. 7 is a diagram showing lenses constituting an imaging optical system in a fourth embodiment and Example 4.

As shown in FIG. 7, the imaging optical system 100 of the present embodiment is constituted of six lenses 10 to 60 and the lens number j is a number of 1 to 6. Furthermore, any of the lenses 10 to 60 is a single lens, the respective single lenses constitute each of lens groups, and the lens group number i coincides with the lens number j. Moreover, the aperture stop ST indicating the aperture stop position is located between the fourth lens 40 having a lens number 4 and the fifth lens 50 having a lens number 5, and m is 4.

In the imaging optical system 100 shown in FIG. 7, the lenses 20 to 60 except the lens 10 are aspherical lenses. In addition, the first lens 10 and the second lens 20 located on the front side of the aperture stop ST are concave lenses. Furthermore, the fifth lens 50 located on the back side of the aperture stop ST is a biconvex lens, and the sixth lens 60 is a meniscus lens. Accordingly, in the case of FIG. 7, the conditions are required to satisfy all Conditional Formulas (1) to (16).

Example 4

Hereinafter, there will be explained Example 4, in which the imaging optical system 100 shown in FIG. 7 is defined numerically. The following Table 7 shows lens data of the imaging optical system 100 in Example 4. Meanwhile, the signs in Table 7 are the same as those in Table 1. Note that FIG. 7 also shows lenses of Example 4.

TABLE 7

| s-n | R | d | nd | ν |
|---|---|---|---|---|
| 1 | 30.1952 | 0.7 | 1.51664 | 96.66 |
| 2 | 4.8663 | 2.5455 | | |
| 3* | −14.2609 | 0.7 | 1.51931 | 73.95 |
| 4* | 1.7617 | 1.8650 | | |
| 5* | 5.7485 | 1 | 1.54917 | 34.65 |
| 6* | −8.7823 | 0.1 | | |
| 7* | 5.6031 | 1 | 1.54917 | 34.65 |
| 8* | −11.2937 | 0.6394 | | |
| 9S | Infinity | 0 | | |
| 10* | 38.7822 | 1 | 1.49660 | 55.71 |
| 11* | −3.1489 | 0.1142 | | |
| 12* | −1.5471 | 0.7 | 1.49660 | 55.71 |
| 13* | −1.0563 | 0.2395 | | |
| 14 | Infinity | 0.4 | 1.52308 | 58.57 |
| 15 | Infinity | 1.7902 | | |

| | aspherical coefficient | | | | |
|---|---|---|---|---|---|
| s-n | c-c | 4th | 6th | 8th | 10th |
| 3 | 7.4004 | 0 | 0 | 0 | 0 |
| 4 | −3.6035 | 4.1021E−02 | −5.6362E−03 | 5.6629E−04 | −8.8435E−05 |
| 5 | 0.1681 | 1.4187E−03 | 2.0434E−04 | −2.8690E−05 | −4.7658E−05 |
| 6 | 7.7552 | −1.0756E−03 | −4.2764E−05 | 1.5683E−04 | 1.8470E−04 |
| 7 | 4.1223 | 2.6097E−03 | 4.7180E−04 | −1.8318E−04 | −3.8834E−04 |
| 8 | −18.6306 | 1.8778E−02 | −4.2878E−03 | −3.9946E−03 | −6.1585E−03 |
| 10 | 100.1859 | −3.9550E−02 | −9.5357E−02 | −1.1445E+00 | 6.2624E+00 |
| 11 | −2.4969 | 6.4109E−03 | −1.3538E−01 | −4.9675E−02 | 1.9688E−01 |
| 12 | −1.1847 | 1.1367E−02 | 1.8236E−02 | −1.6922E−02 | 1.8390E−01 |
| 13 | −1.3238 | −1.6972E−02 | 4.2889E−02 | 6.5501E−02 | −7.0992E−03 | focal length 1.1310
F number 2.91
field angle w 82°
image height y 1.827
*aspherical
S aperture stop As shown in the upper column of Table 7, the specification of the imaging optical system 100 in the present Example 4 is as follows: focal length $f_A$=1.1310 (mm), F number Fno=2.91, and field angle (semi-field angle) w=82 degrees. In this condition, the image height y becomes 1.827 (mm). In addition, the condition values for the above Conditional Formulas (1) to (16) in the present Example 4 are shown in the following Table 8. In this case, all of the condition values for Conditional Formulas (1) to (16) satisfy the respective conditional formulas. Furthermore, the condition values for more preferable Conditional Formulas (1-1) to (16-1) also satisfy all of the respective conditional formulas.

TABLE 8

| nj maximum 1.54917 | | |
|---|---|---|
| w 82° | | |
| L/2y 3.463 | | |
| fA | 1.1310 | fA/fi |
| f1 | −11.3355 | −0.0998 |
| f2 | −2.9749 | −0.3802 |
| f3 | 6.4848 | 0.1744 |
| f4 | 6.9656 | 0.1624 |
| f5 | 5.9115 | 0.1913 |
| f6 | 4.5516 | 0.2485 |
| f7 | — | — |
| f8 | — | — |
| \|Rjk\|/fA minimum | j ≤ m, k = 1, 2 | 1.5576 |

TABLE 8-continued

| nj maximum 1.54917 | | |
|---|---|---|
| w 82° | | |
| L/2y 3.463 | | |
| \|Rjk(R)\|/fA minimum | j > m, k = 1, 2 | 2.7841 |
| \|Rj1(N)\|/fA minimum | j ≤ m | 12.609 |
| \|Rjk(M)\|/fA minimum | j > m, k = 1, 2 | 0.9340 |
| \|Rjk\|/dj minimum | j ≤ m, k = 1, 2 | 2.5167 |
| \|Rjk(R)\|/dj minimum | j > m, k = 1, 2 | 3.1489 |
| \|Rj1(N)\|/dj minimum | j ≤ m | 20.3727 |
| \|Rjk(M)\|/dj minimum | j > m, k = 1, 2 | 1.5091 |
| (dmax − dmin)/fA | | 0.2653 |
| dmin/dmax | | 0.7000 |
| dmax/fA | | 0.8842 |
| damin/fA | | 0.0884 |

Figure 8A:
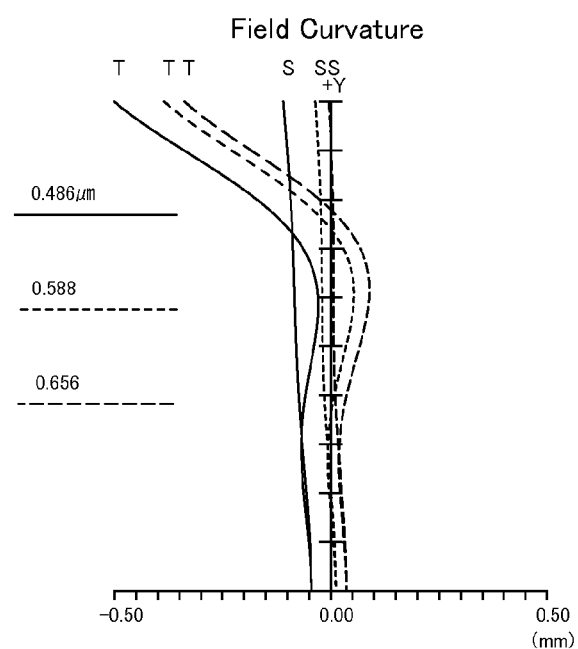
FIG. 8A is a diagram showing a field curvature of lenses in Example 4.
Figure 8B:
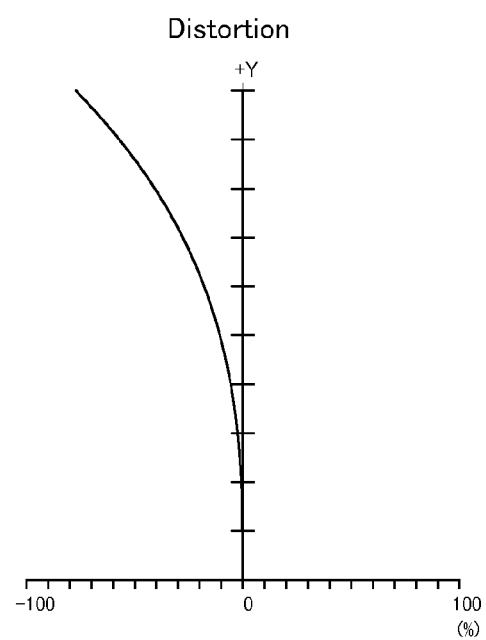
FIG. 8B is a distortion chart of lenses in Example 4.

FIG. 8A shows field curvatures of respective colors at the standard wavelength of 588 nm and the other wavelengths of 656 nm and 486 nm in the image plane PS of the present Example 4, and FIG. 8B shows distortion at the standard wavelength of 588 nm in the image plane PS.

Fifth Embodiment

Hereinafter, an imaging optical system according to a fifth embodiment will be explained. Meanwhile, the imaging optical system according to the fifth embodiment is a modification of the imaging optical system of the first embodiment and the part which is not explained in particular is the same as the part in the first embodiment.

80 is a meniscus lens. Accordingly, in the case of FIG. 9, the conditions are required to satisfy all Conditional Formulas (1) to (16).

Example 5

Figure 9:
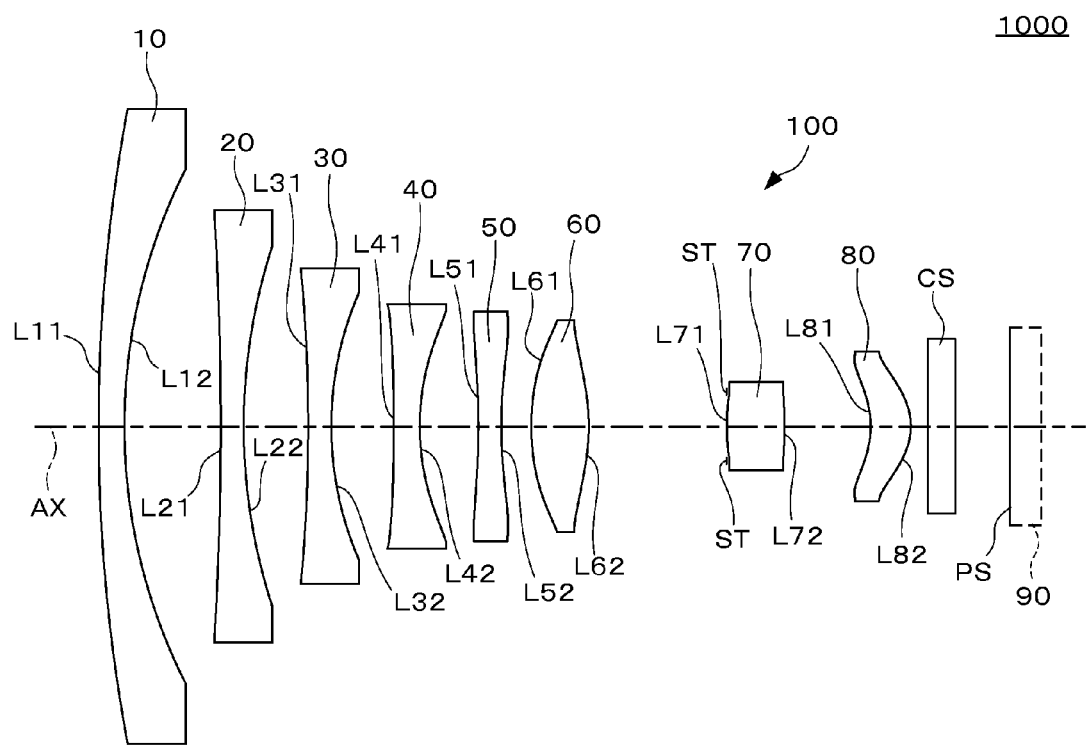
FIG. 9 is a diagram showing lenses constituting an imaging optical system in a fifth embodiment and Example 5.

Hereinafter, there will be explained Example 5 in which the imaging optical system 100 shown in FIG. 9 is defined numerically. The following Table 9 shows lens data of the imaging optical system 100 in Example 5. Meanwhile, the signs in Table 9 are the same as those in Table 1. Note that FIG. 9 also shows lenses of Example 5.

TABLE 9

| s-n | R | d | nd | ν |
|---|---|---|---|---|
| 1 | 30.4827 | 0.45 | 1.49660 | 55.71 |
| 2 | 9.9675 | 1.6729 | | |
| 3 | −62.5776 | 0.4 | 1.49660 | 55.71 |
| 4 | 10.1701 | 1.1197 | | |
| 5 | −29.3205 | 0.4 | 1.49660 | 55.71 |
| 6 | 5.8427 | 1.0881 | | |
| 7* | −33.9075 | 0.45 | 1.49660 | 55.71 |
| 8* | 4.2642 | 1.0175 | | |
| 9* | −14.4680 | 0.4 | 1.49660 | 55.71 |
| 10* | 8.1783 | 0.5207 | | |
| 11* | 4.3876 | 1 | 1.54917 | 34.65 |
| 12* | −3.5466 | 2.3976 | | |
| 13S | Infinity | 0 | | |
| 14* | 3.9638 | 1 | 1.49660 | 55.71 |
| 15* | −6.0343 | 1.4980 | | |
| 16* | −1.6683 | 0.7 | 1.49660 | 55.71 |
| 17* | −1.0399 | 0.2885 | | |
| 18 | Infinity | 0.4817 | 1.52308 | 58.57 |
| 19 | Infinity | 0.9885 | | |

| aspherical coefficient | | | | | |
|---|---|---|---|---|---|
| s-n | c-c | 4th | 6th | 8th | 10th |
| 7 | 242.4875 | 0 | 0 | 0 | 0 |
| 8 | −14.6196 | 1.9463E−02 | −2.7167E−03 | 9.3661E−05 | −2.0543E−05 |
| 9 | −10.7666 | 3.9738E−04 | 2.6914E−04 | 1.0405E−04 | 7.1781E−06 |
| 10 | −0.5918 | −3.4605E−03 | −7.6753E−04 | −1.8133E−04 | 5.2083E−07 |
| 11 | −0.1744 | 1.2707E−02 | −1.5448E−03 | −9.9808E−05 | −5.2472E−05 |
| 12 | −6.0741 | 1.0503E−02 | −3.5339E−04 | −9.5699E−05 | 4.3395E−05 |
| 14 | 32.7746 | −4.4775E−02 | 1.6924E−02 | 2.5121E−01 | −1.7285E+00 |
| 15 | −86.1439 | 5.6534E−02 | −9.3166E−02 | 1.0005E−01 | 1.1149E−01 |
| 16 | −0.9924 | 8.7036E−03 | 3.7992E−02 | −2.9427E−03 | 5.3388E−03 |
| 17 | −1.6381 | −6.1689E−03 | 4.0033E−03 | 9.9319E−03 | 2.4474E−03 | focal length 1.3518
F number 2.86
field angle w 70°
image height y 1.772
*aspherical
S aperture stop As shown in FIG. 9, the imaging optical system 100 of the present embodiment is constituted of eight lenses 10 to 80 and the lens number j is a number from 1 to 8. Furthermore, any of the lenses 10 to 80 is a single lens made of resin and enables the wafer-level manufacturing method to be used. The respective single lenses constitute each of lens groups, and the lens group number i coincides with the lens number j. Moreover, the aperture stop ST indicating the aperture stop position is located between the sixth lens 60 having a lens number 6 and the seventh lens 70 having a lens number 7, and m is 6.

In the imaging optical system 100 shown in FIG. 9, the lenses 40 to 80 except the lenses 10 to 30 are aspherical lenses. Furthermore, the first lens 10 to the fifth lens 50 located on the front side of the aperture stop ST are concave lenses. Moreover, the seventh lens 70 located on the back side of the aperture stop ST is a biconvex lens, and the eighth lens As shown in the upper column of Table 9, the specification of the imaging optical system 100 in the present Example 5 is as follows: focal length $f_A$=1.3518 (mm), F number Fno=2.86, and field angle (semi-field angle) w=70 degrees. In this condition, image height y becomes 1.772 (mm). Furthermore, the condition values for the above Conditional Formulas (1) to (16) in the present Example 5 are shown in the following Table 10. In this case, all of the condition values for Conditional Formulas (1) to (16) satisfy the respective conditional formulas. In addition, the condition values for more preferable Conditional Formulas (1-1) to (16-1) also satisfy all of the respective conditional formulas.

TABLE 10 nj maximum 1.54917
w 70°
L/2y 4.432

| | | fA/fi |
|---|---|---|
| fA | 1.3518 | |
| f1 | −30.0425 | −0.0450 |
| f2 | −17.5845 | −0.0769 |
| f3 | −9.7736 | −0.1383 |
| f4 | −7.598 | −0.1779 |
| f5 | −10.4601 | −0.1292 |
| f6 | 3.7384 | 0.3616 |
| f7 | 4.9828 | 0.2713 |
| f8 | 4.0591 | 0.3330 |
| \|Rjk\|/fA minimum | j ≤ m, k = 1, 2 | 2.6236 |
| \|Rjk(R)\|/fA minimum | j > m, k = 1, 2 | 2.9322 |
| \|Rj1(N)\|/fA minimum | j ≤ m | 10.7027 |
| \|Rjk(M)\|/fA minimum | j > m, k = 1, 2 | 0.7693 |
| \|Rjk\|/dj minimum | j ≤ m, k = 1, 2 | 3.5466 |
| \|Rjk(R)\|/dj minimum | j > m, k = 1, 2 | 3.9638 |
| \|Rj1(N)\|/dj minimum | j ≤ m | 36.1699 |
| \|Rjk(M)\|/dj minimum | j > m, k = 1, 2 | 1.4856 |
| (dmax − dmin)/fA | | 0.4439 |
| dmin/dmax | | 0.4000 |
| dmax/fA | | 0.7398 |
| damin/fA | | 0.3852 |

Figure 10A:
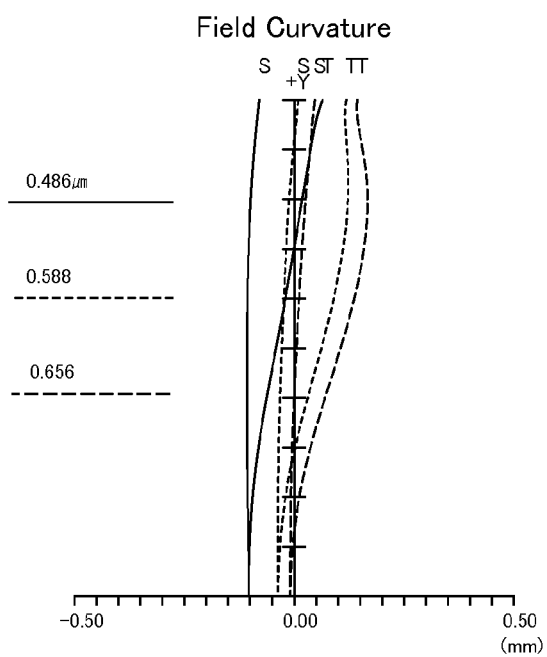
FIG. 10A is a diagram showing a field curvature of lenses in Example 5.
Figure 10B:
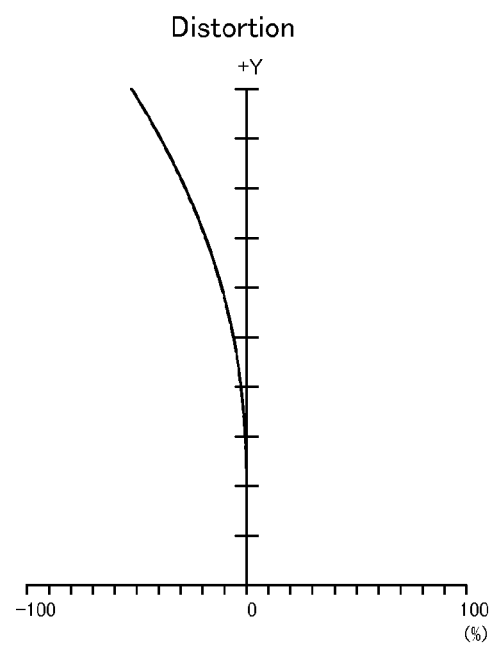
FIG. 10B is a distortion chart of lenses in Example 5.

FIG. 10A shows field curvatures of respective colors at the standard wavelength of 588 nm and the other wavelengths of 656 nm and 486 nm in the image plane PS of the present Example 5, and FIG. 10B shows distortion at the standard wavelength of 588 nm in the image plane PS.

Sixth Embodiment

Hereinafter, an imaging optical system according to a sixth embodiment will be explained. Meanwhile, the imaging optical system according to the sixth embodiment is a modification of the imaging optical system of the first embodiment and the part which is not explained in particular is the same as the part in the first embodiment.

Figure 11:
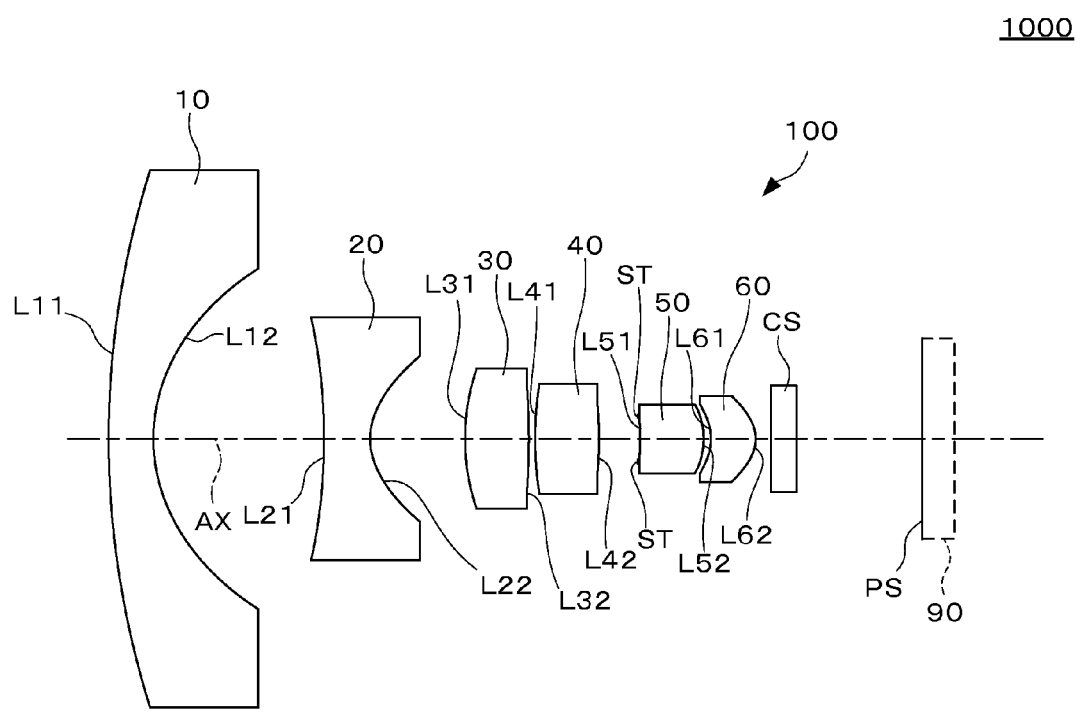
FIG. 11 is a diagram showing lenses constituting an imaging optical system in a sixth embodiment and Example 6.

As shown in FIG. 11, the imaging optical system 100 of the present embodiment is constituted of six lenses 10 to 60 and the lens number j is a number from 1 to 6. Furthermore, any of the lenses 10 to 60 is a single lens, the respective single lenses constitute each of lens groups, and the lens group number i coincides with the lens number j. Moreover, the aperture stop ST indicating the aperture stop position is located between the fourth lens 40 having a lens number 4 and the fifth lens 50 having a lens number 5, and m is 4. While the lens 10, lens 20, lens 50, and lens 60 are assumed to be made of glass, the lens 30 and lens 40 are made of resin and enable the wafer-level manufacturing method to be used.

In the imaging optical system 100 shown in FIG. 11, the lenses 20 to 60 except the lens 10 are aspherical lenses. Meanwhile, the 3rd order to 16th order coefficients including odd-order coefficients are used for the aspherical surface on the object side of the lens 50 for more preferable correction of the aberration. When the odd-order coefficients are included, the aspherical surface has a shape obtained by the axis-symmetrical rotation of a half plane. In addition, the first lens 10 and the second lens 20 located on the front side of the aperture stop ST are concave lenses. Furthermore, the fifth lens 50 and the sixth lens 60 located on the back side of the aperture stop ST are meniscus lenses, and the biconvex lens does not exist on the back side of the aperture stop ST. Accordingly, in the case of FIG. 11, the conditions are required to satisfy the conditional formulas excluding Conditional Formulas (3) and (9) among Conditional Formulas (1) to (16).

Example 6

Hereinafter, there will be explained Example 6 in which the imaging optical system 100 shown in FIG. 11 is defined numerically. The following Table 11 shows lens data of the imaging optical system 100 in Example 6. Meanwhile, the signs in Table 11 are the same as those in Table 1. Note that FIG. 11 also shows lenses of Example 6.

TABLE 11

| s-n | R | d | nd | ν |
|---|---|---|---|---|
| 1 | 24.4751 | 0.7 | 1.49700 | 81.55 |
| 2 | 4.6535 | 2.6747 | | |
| 3* | −16.5167 | 0.7225 | 1.48375 | 85.08 |
| 4* | 1.7596 | 1.4866 | | |
| 5* | 6.1045 | 1 | 1.60733 | 26.99 |
| 6* | −19.3624 | 0.1 | | |
| 7* | 10.7950 | 1 | 1.60733 | 26.99 |
| 8* | −9.7190 | 0.6389 | | |
| 9S | Infinity | 0 | | |
| 10* | −39.1993 | 1 | 1.49700 | 81.55 |
| 11 | −2.0386 | 0.115 | | |
| 12* | −1.4023 | 0.7 | 1.49700 | 81.55 |
| 13* | −1.0119 | 0.2395 | | |
| 14 | Infinity | 0.4 | 1.52308 | 58.57 |
| 15 | Infinity | 1.9664 | | |

| aspherical coefficient | | | | | |
|---|---|---|---|---|---|
| s-n | c-c | 3rd 11th | 4th 12th | 5th 13th | 6th 14th |
| 3 | 5.8470 | 0 | −4.3657E−06 | 0 | 2.8070E−07 |
| 4 | −3.7872 | 0 | 3.5071E−02 | 0 | −5.8798E−03 |
| 5 | 0.2631 | 0 | 2.6987E−03 | 0 | −3.5834E−04 |
| 6 | −11.5919 | 0 | −2.3110E−04 | 0 | 3.2118E−04 |
| 7 | −2.8193 | 0 | 4.1106E−03 | 0 | 5.3882E−04 |
| 8 | −41.0011 | 0 | 1.8805E−02 | 0 | −1.9054E−02 |
| 10 | −100.9024 | −1.0398E−02 | −6.6060E−02 | 1.0710E−01 | 3.8403E−02 |
| | | −7.4834E+01 | 1.2174E+02 | −5.0932E+00 | 2.3384E+01 |

TABLE 11-continued

| | | | | | |
|---|---|---|---|---|---|
| 11 | −2.5171 | 0 | 1.1550E−02 | 0 | −1.3986E−01 |
| | | 0 | −1.4680E−01 | 0 | 1.2850E−01 |
| 12 | −1.0252 | 0 | 1.1109E−02 | 0 | 2.8094E−02 |
| | | 0 | −3.2843E−02 | 0 | 1.3636E−01 |
| 13 | −1.1881 | 0 | −2.1931E−02 | 0 | 2.4104E−02 |

| s-n | 7th 15th | 8th 16th | 9th | 10th |
|---|---|---|---|---|
| 3 | 0 | 3.1082E−08 | 0 | 3.4718E−09 |
| 4 | 0 | 7.3869E−04 | 0 | −6.5104E−05 |
| 5 | 0 | −1.7817E−04 | 0 | −3.1645E−05 |
| 6 | 0 | 7.0927E−04 | 0 | 1.8829E−04 |
| 7 | 0 | 5.3001E−04 | 0 | −1.4764E−03 |
| 8 | 0 | −2.7376E−02 | 0 | −2.9125E−02 |
| 10 | 4.7736E−02 | −1.4675E+00 | −1.9820E+00 | 3.5576E+00 |
| | 4.1511E+02 | 6.9765E+02 | | |
| 11 | 0 | −6.0083E−02 | 0 | 1.4881E−01 |
| | 0 | −1.1795E−02 | | |
| 12 | 0 | −1.1766E−02 | 0 | 2.4664E−01 |
| | 0 | 0 | | |
| 13 | 0 | 4.5856E−02 | 0 | −2.8579E−02 | focal length 1.1252
F number 2.83
field angle w 78°
image height y 1.791
*aspherical
S aperture stop (In the above, about that in which surface number is common, an upper line shows the lower order and the lower line shows the higher order.)

As shown in the upper column of Table 11, the specification of the imaging optical system 100 in the present Example 6 is as follows: focal length $f_A$=1.1252 (mm), F number Fno=2.83, and field angle (semi-field angle) w=78 degrees. In this condition, the image height y becomes 1.791 (mm). Furthermore, the condition values for the conditional formulas excluding Conditional Formulas (3) and (9) among Conditional Formulas (1) to (16) in the present Example 6 are shown in the following Table 12. In this case, all of the condition values for the conditional formulas excluding Conditional Formulas (3) and (9) satisfy the respective conditional formulas. In addition, the condition values for more preferable Conditional Formulas (1-1) to (16-1) also satisfy all of the respective conditional formulas excluding Conditional Formulas (3-1) and (9-1) for which condition values do not exist.

TABLE 12

| nj maximum 1.60733 | | |
|---|---|---|
| w 78° | | |
| L/2y 3.519 | | |
| fA | 1.1252 | fA/fi |
| f1 | −11.6986 | −0.0962 |
| f2 | −3.24541 | −0.3467 |
| f3 | 7.7572 | 0.1451 |
| f4 | 8.57917 | 0.1312 |
| f5 | 4.288516 | 0.2624 |
| f6 | 4.583942 | 0.2455 |
| f7 | — | — |
| f8 | — | — |
| |Rjk|/fA minimum | j ≤ m, k = 1, 2 | 1.5638 |
| |Rjk(R)|/fA minimum | j > m, k = 1, 2 | — |
| |Rj1(N)|/fA minimum | j ≤ m | 4.679 |
| |Rjk(M)|/fA minimum | j > m, k = 1, 2 | 0.8993 |
| |Rjk|/dj minimum | j ≤ m, k = 1, 2 | 2.4354 |
| |Rjk(R)|/dj minimum | j > m, k = 1, 2 | — |
| |Rj1(N)|/dj minimum | j ≤ m | 22.860 |
| |Rjk(M)|/dj minimum | j > m, k = 1, 2 | 1.4455 |
| (dmax − dmin)/fA | | 0.2666 |

TABLE 12-continued

| nj maximum 1.60733 | |
|---|---|
| w 78° | |
| L/2y 3.519 | |
| dmin/dmax | 0.7000 |
| dmax/fA | 0.8887 |
| damin/fA | 0.0889 |

Figure 12A:
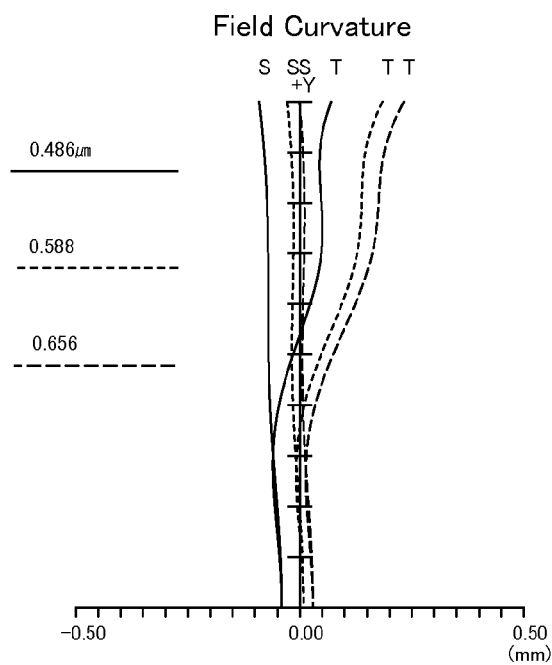
FIG. 12A is a diagram showing a field curvature of lenses in Example 6.
Figure 12B:
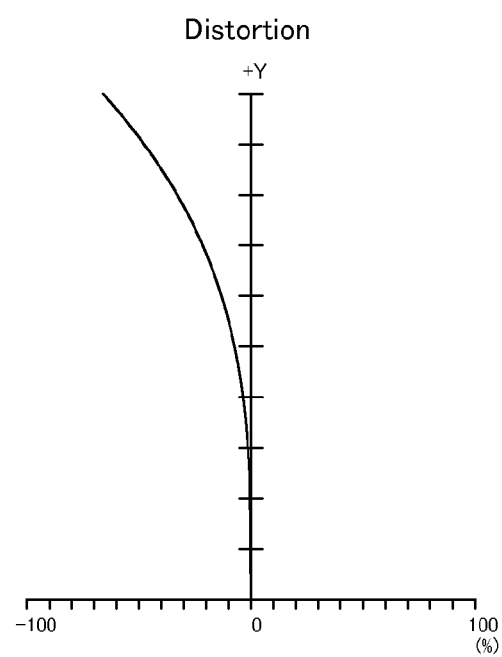
FIG. 12B is a distortion chart of lenses in Example 6.

FIG. 12A shows field curvatures of respective colors at the standard wavelength of 588 nm and the other wavelengths of 656 nm and 486 nm in the image plane PS of the present Example 6, and FIG. 12B shows distortion at the standard wavelength of 588 nm in the image plane PS.

The condition values for the above Conditional Formulas (1) to (16) in the above-described first to sixth embodiments are shown in Table 13 collectively.

TABLE 13

| | | Example 1 | Example 2 | Example 3 |
|---|---|---|---|---|
| nj maximum | | 1.54917 | 1.54917 | 1.54917 |
| w | | 92° | 82° | 82° |
| L/2y | | 3.80 | 3.658 | 3.899 |
| fA/|fi|maximum | | 0.3162 | 0.3478 | 0.2857 |
| |Rjk|/fA minimum | j ≤ m | 2.2474 | 2.4551 | 2.5534 |
| |Rjk(R)|/fA minimum | j > m | — | 5.1654 | 4.0285 |
| |Rj1(N)|/fA minimum | j ≤ m | 21.846 | 33.420 | 12.595 |
| |Rjk(M)|/fA minimum | j > m | 1.3160 | 0.9108 | 0.8841 |
| |Rjk|/dj minimum | j ≤ m | 2.8871 | 2.5282 | 3.7211 |
| |Rjk(R)|/dj minimum | j > m | — | 5.8512 | 4.5547 |
| |Rj1(N)|/dj minimum | j ≤ m | 26.4928 | 63.0948 | 35.5991 |
| |Rjk(M)|/dj minimum | j > m | 1.4869 | 1.4740 | 1.4279 |
| (dmax − dmin)/fA | | 0.6267 | 0.618 | 0.5307 |
| dmin/dmax | | 0.3804 | 0.3636 | 0.4 |
| dmax/fA | | 1.0115 | 0.9711 | 0.8845 |
| damin/fA | | 0.4950 | 0.1210 | 0.0884 |

| | Example 4 | Example 5 | Example 6 |
|---|---|---|---|
| nj maximum | 1.54917 | 1.54917 | 1.60733 |
| w | 82° | 70° | 78° |
| L/2y | 3.463 | 4.432 | 3.519 |

TABLE 13-continued

| | | | | |
|---|---|---|---|---|
| fA/\|fi\|maximum | | 0.3802 | 0.3616 | 0.3467 |
| \|Rjk\|/fA minimum | j ≤ m | 1.5576 | 2.6236 | 1.5638 |
| \|Rjk(R)\|/fA minimum | j > m | 2.7841 | 2.9322 | — |
| \|Rj1(N)\|/fA minimum | j ≤ m | 12.609 | 10.703 | 14.679 |
| \|Rjk(M)\|/fA minimum | j > m | 0.9340 | 0.7693 | 0.8993 |
| \|Rjk\|/dj minimum | j ≤ m | 2.5167 | 3.5466 | 2.4354 |
| \|Rjk(R)\|/dj minimum | j > m | 3.1489 | 3.9638 | — |
| \|Rj1(N)\|/dj minimum | j ≤ m | 20.3727 | 36.1699 | 22.860 |
| \|Rjk(M)\|/dj minimum | j > m | 1.5091 | 1.4856 | 1.4455 |
| (dmax − dmin)/fA | | 0.2653 | 0.4439 | 0.2666 |
| dmin/dmax | | 0.7 | 0.4 | 0.7 |
| dmax/fA | | 0.8842 | 0.7398 | 0.8887 |
| damin/fA | | 0.0884 | 0.3852 | 0.0889 |

Although, hereinbefore, the imaging optical systems according to the present embodiments have been explained, the imaging optical system according to some implementations is not limited to the above described imaging optical systems. For example, in the above embodiments, the number of lenses constituting the imaging optical system 100 may be a number other than the above numbers (6 to 8). In addition, while the lens group is constituted of single lenses in the above examples, the lens group may be constituted of a cemented lens.

Furthermore, while, in the above described embodiments, most of the lenses constituting the imaging optical system 100 have aspherical surfaces, a half or more than half of the lenses may have aspherical surfaces.

Figure 13:
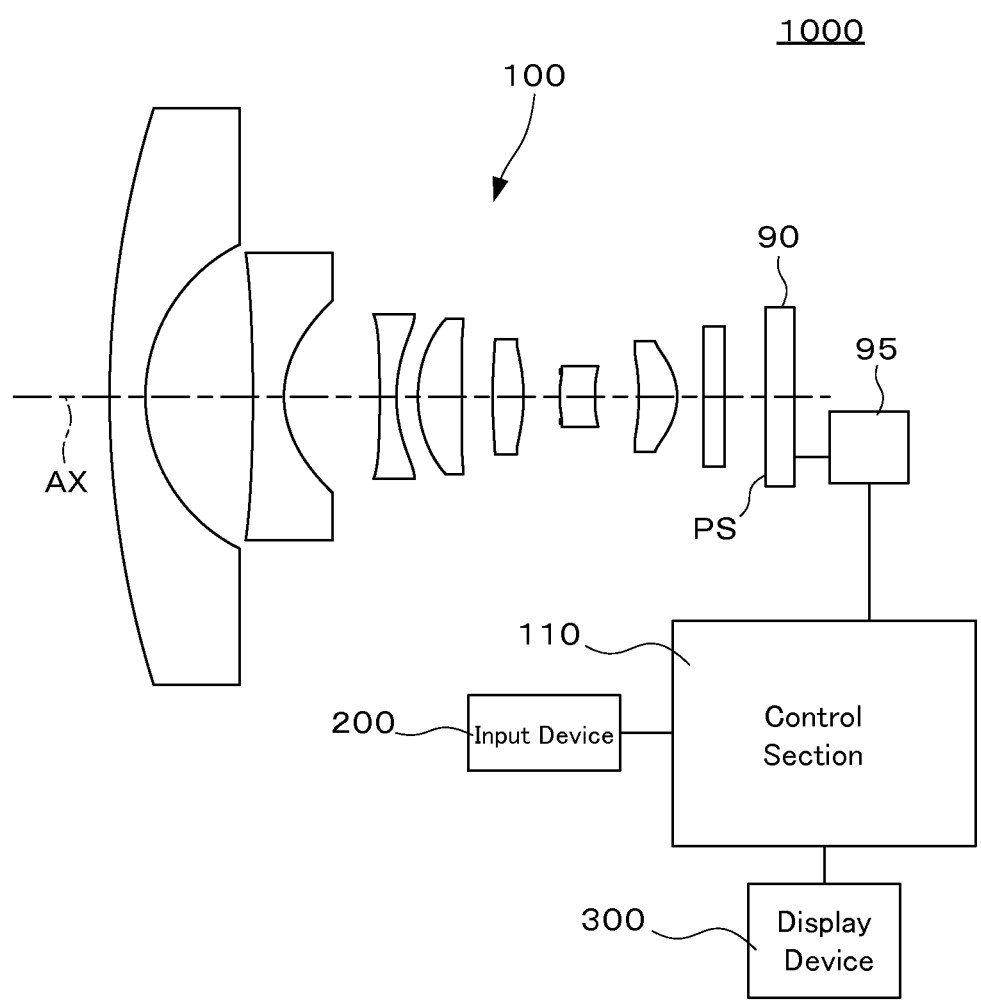
FIG. 13 is a diagram for explaining an example of imaging equipment provided with an imaging optical system.

Hereinafter, an example of imaging equipment which is provided with the imaging optical system according to the present embodiments will be explained with reference to FIG. 13. FIG. 13 is a block diagram showing an example of the control action in the imaging equipment 1000 shown in FIG. 1, for example. As shown in FIG. 13, in this example, other than the above described imaging optical system 100, imaging device 90, and drive circuit 95, the imaging equipment 1000 is provided with a control section 110 which includes, for example, a CPU, a storage device and the like, and controls the whole action including the imaging action. Furthermore, the imaging equipment 1000 is provided with an input device 200 and a display device 300 as necessary, integrally or individually. Here, the drive circuit 95, upon receiving a control signal from the control section 110, causes the imaging device 90 to perform the imaging action and also transmits an image signal obtained by the imaging device 90 to the control section 110. That is, the actions of the imaging device 90 and the drive circuit 95 are controlled by the control section 110. Furthermore, the control section 110, in addition to the control of the imaging action as described above, performs various kinds of image processing such as, for example, image data storage. Specifically, the control section 110 performs temporary storage of the image data based on the image signal received from the drive circuit 95. Moreover, the control section 110, on receiving an instruction signal based on user operation via the input device 200, performs various kinds of action such as, for example, start and stop of the imaging action and the image storage into the storage device, according to the instruction signal, and also transmits the image signal to the display device 300 to thereby cause the display device 300 to perform a display action of a captured image. Meanwhile, as to the display device 300, various kinds of display devices such as a liquid crystal monitor can be applied, and when the imaging equipment 1000 is, for example, a car-mounted camera (rearview camera), there can be applied a display device which can be used also as a display unit for car navigation, and the like.

What is claimed is:

1. An imaging optical system for a solid-state imaging device having an image size of ½ inches or less, the system comprising:
   a plurality of lens groups, wherein
   a half or more than half of a total number of single lenses constituting the plurality of lens groups have aspherical surfaces,
   a F number is smaller than 4, and
   following conditional formulas (1), (2), (3), (4), and (5) are satisfied, when a focal length of the whole imaging optical system is set to $f_A$, each lens group number in the plurality of lens groups is set to i, a focal length in each of the lens groups is set to $f_i$, each lens number of single lenses constituting the lens groups is set to j, an optical index of the lens having the lens number j is set to $n_j$, a radius of curvature on an object side of the single lens having the lens number j is set to $R_{j1}$, the radius of curvature on an image side of the single lens is set to $R_{j2}$, furthermore, the radius of curvature on the object side of a biconvex lens or a biconcave lens among the single lenses is set to $R_{j1(R)}$, the radius of curvature on the image side of the biconvex lens or the biconcave lens is set to $R_{j2(R)}$, an aperture stop position is located between the lens having a lens number m and the lens having a lens number (m+1), and a field angle is set to w, $$f_A/|f_i|<0.425 \tag{1},$$

$$|R_{jk}|/f_A>1.5 \; (j\leq m, k=1,2) \tag{2},$$

$$|R_{jk(R)}|/f_A>2.0 \; (j>m, k=1,2) \tag{3},$$

$$n_j<1.80 \tag{4},$$

$$w>40° \tag{5}.$$

2. The imaging optical system according to claim 1, wherein
   following conditional formulas (6) and (7) are satisfied, when the radius of curvature on the object side of a concave lens among the single lenses is set to $R_{j1(N)}$, the radius of curvature on the object side of a meniscus lens among the single lenses is set to $R_{j1(M)}$, and the radius of curvature on the image side of the meniscus lens is set to $R_{j2(M)}$:

$$|R_{j1(N)}|/f_A>5.0 \; (j\leq m) \tag{6},$$

$$|R_{jk(M)}|/f_A>0.5 \; (j>m, k=1,2) \tag{7}.$$

3. The imaging optical system according to claim 1, wherein
   following conditional formulas (8), (9), (10), and (11) are satisfied, when the radius of curvature on the object side of a concave lens among the single lenses is set to $R_{j1(N)}$, the radius of curvature on the object side of a meniscus lens is set to $R_{j1(M)}$, and the radius of curvature on the image side thereof is set to $R_{j2(M)}$ among the single lenses, and
   central thickness of the single lens is set to $d_j$ $$|R_{jk}|/d_j>1.9 \; (j\leq m, k=1,2) \tag{8},$$

$$|R_{jk(R)}|/d_j>1.8 \; (j>m, k=1,2) \tag{9},$$

$$|R_{jk(N)}|/d_j>7.0 \; (j\leq m) \tag{10},$$

$$|R_{jk(M)}|/d_j>0.6 \; (j>m, k=1,2) \tag{11}.$$

4. The imaging optical system according to claim 1, wherein following conditional formulas (12), (13), (14), (15), and (16) are satisfied, when the largest thickness is set to $d_{max}$ and the smallest thickness is set to $d_{min}$ among the central thicknesses of the single lenses, a minimum value of air gaps between lenses is set to $da_{min}$, lens entire length is set to L, and a maximum image height is set to y $$(d_{max}-d_{min})/f_A<1.0 \qquad (12),$$

$$d_{min}/d_{max}>0.25 \qquad (13),$$

$$d_{max}/f_A<1.50 \qquad (14),$$

$$1.0>da_{min}/f_A>0.05 \qquad (15),$$

$$L/2y<7 \qquad (16).$$

5. The imaging optical system according to claim 1, wherein
the single lens is manufactured at a wafer level lens manufacturing method and assembled.

6. The imaging optical system according to claim 1, wherein
the single lens is formed of an optical material having resistance to a solder reflow temperature of 250° C. or more.

7. Imaging equipment, comprising:
the imaging optical system according to claim 1; and
an imaging device onto which an image on an object is projected by the imaging optical system.

\* \* \* \* \*

UNITED STATES PATENT AND TRADEMARK OFFICE
CERTIFICATE OF CORRECTION

PATENT NO. : 9,195,033 B2  
APPLICATION NO. : 14/227721  
DATED : November 24, 2015  
INVENTOR(S) : Toshihiro Sasaya Page 1 of 1

It is certified that error appears in the above-identified patent and that said Letters Patent is hereby corrected as shown below:

In the Specification

In column 8 at line 16, After "set to" insert --$R_{j1}$--.

In the Claims

In column 30 at line 63 (approx.), In Claim 3, change "/$R_{jk(N)}$|/$d_j$>7.0 ($j \leq m$)" to --/$R_{j1(N)}$|/dj>7.0 (j$\leq$m)--.

Signed and Sealed this  
Ninth Day of August, 2016

Michelle K. Lee  
*Director of the United States Patent and Trademark Office*